United States Patent
Puri et al.

(10) Patent No.: US 11,231,280 B2
(45) Date of Patent: Jan. 25, 2022

(54) PROBABILISTIC PARKING ROUTES

(71) Applicant: INRIX Inc., Kirkland, WA (US)

(72) Inventors: Indra Puri, Issaquah, WA (US); Linjun Zhou, Issaquah, WA (US); William M Hsu, Redmond, WA (US); Dominic Jason Jordan, Manchester (GB); Patchrawat Uthaisombut, Sammamish, WA (US); Douglas Irvine, Seattle, WA (US)

(73) Assignee: INRIX Inc., Kirkland, WA (US)

( * ) Notice: Subject to any disclaimer, the term of this patent is extended or adjusted under 35 U.S.C. 154(b) by 62 days.

(21) Appl. No.: 16/029,091

(22) Filed: Jul. 6, 2018

(65) Prior Publication Data

US 2020/0011671 A1 Jan. 9, 2020

(51) Int. Cl.
*G01C 21/20* (2006.01)
*G08G 1/14* (2006.01)
(Continued)

(52) U.S. Cl.
CPC ............. *G01C 21/20* (2013.01); *B60W 30/06* (2013.01); *G01C 21/3461* (2013.01);
(Continued)

(58) Field of Classification Search
CPC ................ G01C 21/20; G01C 21/3461; G01C 21/3691; G05D 1/0212; G05D 2201/0213; G08G 1/141; B60W 30/06
See application file for complete search history.

(56) References Cited

U.S. PATENT DOCUMENTS

| | | | | |
|---|---|---|---|---|
| 7,239,962 | B2 * | 7/2007 | Plutowski | G01C 21/3415 340/995.11 |
| 2005/0280555 | A1 * | 12/2005 | Warner, IV | G08G 1/14 340/932.2 |

(Continued)

FOREIGN PATENT DOCUMENTS

| | | | | |
|---|---|---|---|---|
| CN | 103026174 A | * | 4/2013 | ............. G01C 21/34 |
| GB | 2528081 A | * | 1/2016 | ......... G01C 21/3617 |

OTHER PUBLICATIONS

"Probabilistic Routing for On-Street Parking Search" by Arndt et al. 13 Pages (DOI: 10.4230/LIPIcs.ESA.2016.264). Retrieved Online @ https://drops.dagstuhl.de/opus/volltexte/2016/6348/pdf/LIPIcs-ESA-2016-6.pdf: Last Accessed Sep. 4, 2021 (Year: 2016).*

(Continued)

*Primary Examiner* — Behrang Badii
*Assistant Examiner* — Daniel L Greene
(74) *Attorney, Agent, or Firm* — Cooper Legal Group, LLC

(57) ABSTRACT

Contemporary navigation systems are often tasked with routing a vehicle to a destination, but are poorly equipped to assist with finding a vacancy of a parking opportunity in which the vehicle may be parked. Static information, such as enumeration of parking garages and curbside parking meters, may be frustrating if such parking opportunities have no vacancies. The determination of vacancies with certainty may be difficult to achieve due to the characteristic volatility of parking, in which vacancies may be taken in seconds. Presented herein are navigation device configurations involving probabilistic evaluation of parking routes in a vicinity of a destination that may be generated and compared, optionally weighted by various factors, to identify a parking route with parking opportunities that collectively present a high probability of vacancy as compared (Continued)

with other parking routes, which may be presented to the user and/or appended to a current route of an autonomous vehicle.

20 Claims, 12 Drawing Sheets

(51) Int. Cl.
    *G05D 1/02*     (2020.01)
    *G01C 21/34*     (2006.01)
    *B60W 30/06*     (2006.01)
    *G01C 21/36*     (2006.01)

(52) U.S. Cl.
    CPC ....... *G01C 21/3691* (2013.01); *G05D 1/0212* (2013.01); *G08G 1/141* (2013.01); *G05D 2201/0213* (2013.01)

(56) References Cited

U.S. PATENT DOCUMENTS

| | | | |
|---|---|---|---|
| 2011/0025267 A1* | 2/2011 | Kamen | B60L 8/003 320/109 |
| 2012/0078504 A1 | 3/2012 | Zhou | |
| 2014/0214319 A1* | 7/2014 | Vucetic | G01C 21/3446 701/533 |
| 2014/0266800 A1* | 9/2014 | Koukoumidis | G08G 1/146 340/932.2 |
| 2015/0279213 A1* | 10/2015 | Balter | G01C 21/36 705/13 |
| 2015/0369613 A1* | 12/2015 | Stadler | G01C 21/32 701/537 |
| 2016/0061618 A1* | 3/2016 | Benenson | G01C 21/3453 701/428 |
| 2016/0178376 A1 | 6/2016 | Moore | |
| 2016/0364985 A1* | 12/2016 | Penna | G08G 1/143 |
| 2017/0138746 A1 | 5/2017 | Eliassi et al. | |
| 2017/0178511 A1* | 6/2017 | Berns | G08G 1/142 |
| 2017/0191849 A1* | 7/2017 | Agam | G08G 1/0112 |
| 2017/0192437 A1* | 7/2017 | Bier | G05D 1/0287 |
| 2017/0323227 A1* | 11/2017 | Sadeghi | G07F 17/246 |
| 2019/0376810 A1* | 12/2019 | Prokhorenkov | G01C 21/3685 |
| 2021/0010824 A1* | 1/2021 | Muraleev | G08G 1/143 |

OTHER PUBLICATIONS

Corresponding International Patent Application No. PCT/US19/47641, International Search Report and Written Opinion, dated Nov. 15, 2019.

* cited by examiner

1200

| TEST DRIVES SET | TEST NUMBER | PARKING FOUND |
|---|---|---|
| 1.1 | TEST #1 | YES |
| | TEST #2 | YES |
| | TEST #3 | YES |
| | TEST #4 | YES |
| | TEST #5 | YES |
| | TEST #6 | NO |
| | TEST #7 | NO |
| | TEST #8 | NO |
| 2.1 | TEST #1 | NO |
| | TEST #2 | YES |
| | TEST #3 | YES |
| | TEST #4 | YES |
| | TEST #6 | YES |
| | TEST #8 | YES |
| | TEST #9 | NO |
| 3.1 | TEST #1 | YES |
| | TEST #3 | YES |
| | TEST #4 | YES |
| | TEST #5 | YES |
| | TEST #7 | NO |
| | TEST #8 | YES |

FIG. 12

PROBABILISTIC PARKING ROUTES

BACKGROUND

Within the field of computing, many scenarios involve a navigation device that facilitates the navigation of a vehicle from a starting point or current location to a destination. For example, a navigation device in an automobile may store or have access to a database of streets, and may fulfill a request for navigation assistance to reach a particular destination by identifying a route between the current location of the automobile and the destination, and then providing directions that the user may follow. The level of assistance may vary among devices and scenarios, such as presenting a simple map of the route to the destination; providing audible and/or haptic cues to guide the user's navigation, and updating the series of cues based on the current location of the automobile; and displaying turn-by-turn instructions on a visible output device, optionally including augmented reality displays that coordinate output with a driver's view of the environment. In some scenarios, the routing may include autonomously controlling the vehicle, such as autonomously driving a vehicle to a destination selected by a non-driving passenger.

Because users often need to park a vehicle near a destination, navigation devices often feature capabilities to assist the user in finding places for parking. For example, a device may display a map of parking opportunities near the destination, such as parking garages and parking lots. Some devices may display additional information about each parking opportunity to assist the user's selection, such as the cost of a parking garage. If the user selects a parking opportunity, the device may adjust a route toward the destination to navigate the vehicle to the selected parking opportunity. In this manner, conventional navigation devices may assist the user not only in navigating to the destination, but in finding parking near the destination for the vehicle.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

While many navigation devices may include capabilities to assist with the task of parking a vehicle near a destination, such techniques are often limited to presenting a list of options for the user's selection. However, parking opportunities are characteristically volatile, and the user may be keenly interested in determining the probability that parking is actually available at respective parking opportunities. For example, a conventional device may inform the user of four parking opportunities that are near the destination, but the user may be unable to determine which parking opportunities have available parking. The user may have to visit each parking opportunity in sequence, and may be repeatedly turned away, e.g., if parking garages is full or all metered parking spots along a street are taken. In many cases, the user's search may be prolonged and frustrating, e.g., if the user visits a high number of parking opportunities that are unavailable. Additionally, these instances may reflect a period of high driver distractability—e.g., the user's attention may be divided among the parking opportunity map presented by the device, looking for the corresponding garages or spots in the vicinity of the vehicle, and actually operating the vehicle—which may be particularly stressful for the driver, and may present a danger in the form of an elevated risk of accidents. In some cases, drivers may opt to reduce this frustration by choosing an available but unfavorable parking opportunity—e.g., a parking opportunity that is relatively far away from the destination, or a parking opportunity with a high cost, such as an expensive parking garage—when other, more favorable parking opportunities may be nearby (e.g., the user may park far away from the destination, and may then pass ample available parking while walking the long distance to the destination).

These and other problems may be reduced through advancement of parking facilitation capabilities of navigation devices. In accordance with such advancement, a navigation device may store or have access to a data source of parking opportunities that includes a likelihood that parking is available at the respective opportunities. Because it may be rare to establish the availability of these opportunities with certainty and to provide a guarantee, it may be advantageous to formulate the parking search in a probabilistic manner, e.g., as a general determination that the user's odds of finding parking near the destination may be improved by searching near the destination in accordance with a particular parking route. For example, a set of roads near the destination may present a variety of parking opportunities with variable but predictable probabilities of availability at the current time. The predicted probabilities may account for a variety of information, such as weekday and the time of day; the incidence of events near the destination that increase or decrease demand for parking; and data from other vehicles that are navigating to and/or near the destination, including notifications of vacated parking opportunities. A probabilistic comparison of the parking opportunities along each candidate route may reveal that a particular route may maximize the user's likelihood of locating available parking. In some scenarios, the comparison of the routes may include additional weighting factors, e.g., the walking distance from the destination; weather and safety conditions; and/or the user's sensitivity to such factors as parking costs, potentially protracted searching for parking, and walking for extended distances. The selection of a parking route, based on the parking probabilities of vacancies in the respective parking opportunities, may be presented to the user as a supplement of the navigation instructions to the destination, and/or may inform autonomous control of the vehicle to promote the securement of a vacant parking opportunity near the destination.

As a first example embodiment of the techniques presented herein, a device may provide navigation of a vehicle to park near a destination. The device may comprise a processor and memory storing instructions that, when executed by the processor, cause the device to identify a set of routes near the destination, respective routes comprising a set of segments; for respective routes near the destination, aggregate parking probabilities of parking opportunities along the segments of the route to identify a parking route probability for the route; compare the parking route probabilities of the respective routes to select a parking route; and navigate the vehicle based on the parking route.

As a second example embodiment of the techniques presented herein, a method of navigating a vehicle may include the task of parking the vehicle near a destination. The method may involve a device having a processor, and may comprise executing, by the processor, instructions that cause the device to identify a set of routes near the destination, respective routes comprising a set of segments; for the respective routes, aggregate parking probabilities of parking opportunities along the segments of the route to identify a parking route probability for the route; compare the parking route probabilities of the respective routes to select a parking route; and navigate the vehicle based on the parking route.

As a third example embodiment of the techniques presented herein, a method of assisting a driver of a vehicle traveling along a current route to a destination may include the task of parking the vehicle near a destination. The method involving a device having a processor, and may comprise executing, by the processor, instructions that cause the device to identify a set of routes directed outward from the destination, respective routes comprising a set of segments; for a selected route, identify parking probabilities for parking opportunities along respective segments of the selected route, and aggregate the parking probabilities to identify a parking route probability of the selected route; identify a parking route that has a high parking route probability among the set of routes; append the parking route to the current route to generate a supplemented route; and present the supplemented route for the driver of the vehicle.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DESCRIPTION OF THE DRAWINGS

FIG. 12 is a data set showing results of field testing of the techniques presented herein.

DETAILED DESCRIPTION

Figure 1:
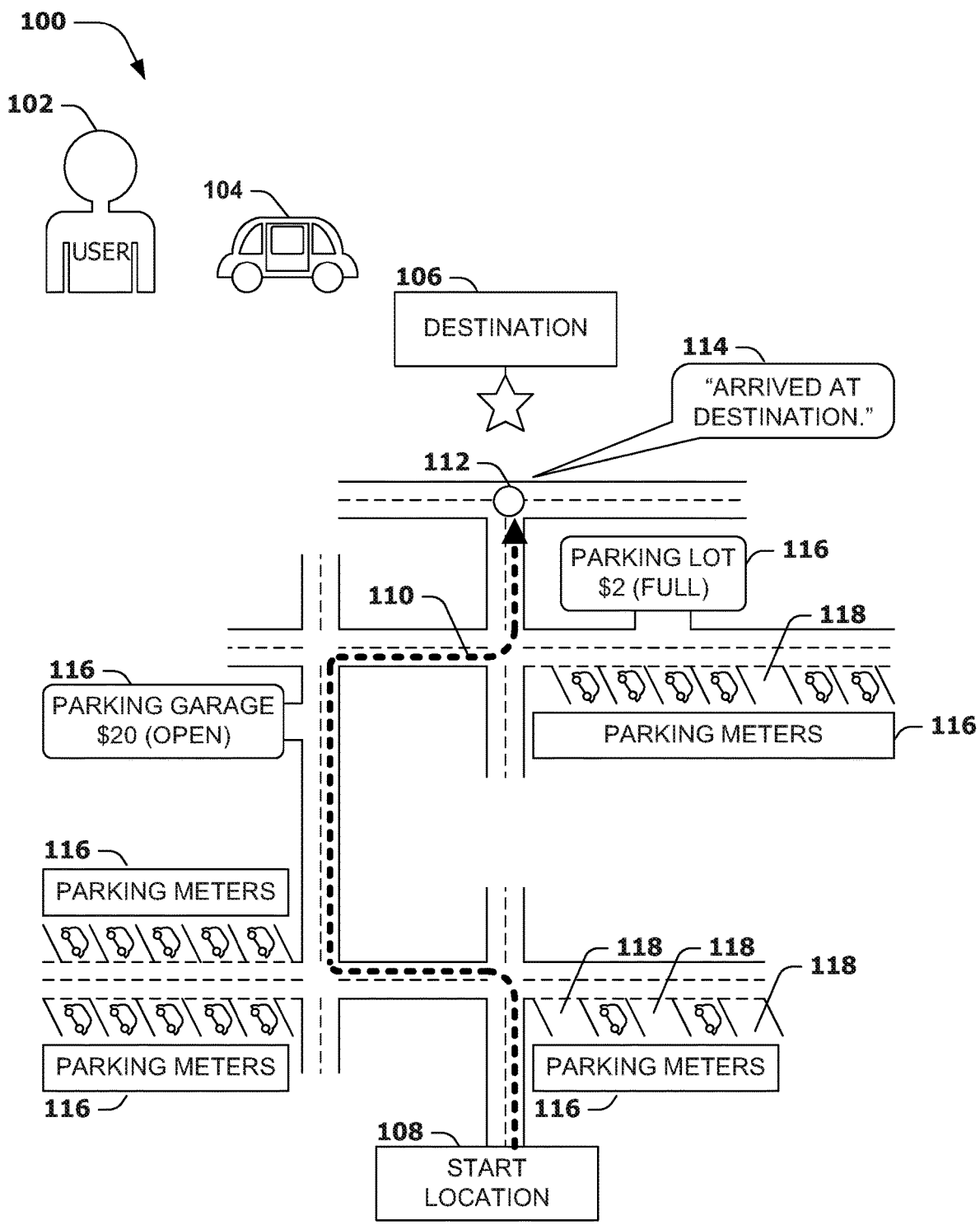
FIG. 1 is an illustration of an exemplary scenario featuring a device that facilitates a user in navigating a vehicle to a destination.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

A. Introduction

FIG. 1 is an illustration of an example scenario 100 in which a user 102 navigates a vehicle 104 to a destination 106. In this example scenario 100, the user 102 begins driving the vehicle 104 at a start location 108, such as the user's home, and inputs the destination 106 to which the user 102 wishes to travel. A navigation device on board the vehicle 104 may calculate a route 110 between the start location 108 and an endpoint 112 near the destination 106, such as the closest point on the closest road to the destination 106. The navigation device may then present to the user 102 a set of navigation instructions 114, such as turn-by-turn directions that enable the user 102 to follow the set of roads to reach the endpoint 112 near the destination 106.

When the user 102 reaches the destination 106, the navigation device on board the vehicle 104 may present a navigation instruction 114 indicating the completion of the route 110 and arrival at the destination 106. However, at this time, the user 102 may find that the vehicle 104 cannot be parked at the destination 106. For instance, the user 102 may have selected the destination 106 as a restaurant that is presumed to feature an adjacent parking lot, but upon arriving at the restaurant, the user 102 may find that the restaurant offers no such parking. Instead, the user 102 may now have to search for parking in the vicinity of the destination 106.

In some scenarios, the navigation device on board the vehicle 104 may have no capability to assist the user 102 in searching for parking, so the user 102 may have to conduct a fully self-driven search. In other scenarios, the navigation device may provide some information to assist the user's search. For instance, the navigation device may search for parking opportunities 116 near the destination 106, such as public parking garages, public parking lots, and curbside parking meters. The device may present a map to the user 102, optionally including other information that may inform the user's search, such as the anticipated costs of various parking lots. The user 102 may browse the options and select a desirable parking opportunity 116, such as a parking lot that is both near the destination 106 (thus reducing walking time) and also acceptably priced. The device may accept the user input as a new destination and route the user 102 to the selected parking opportunity 116 to aid the user with the task of parking the vehicle.

However, the search of the user 102 for parking at this point in time, even with modest assistance by the navigation device of the vehicle 104, may present a number of disadvantages due to the volatile nature of parking, wherein vacancies 118 may be scarce and/or fleeting.

As a first example, the user 102 may find that the destination 106 is in the midst of several parking opportunities 116, but that many of the parking opportunities 116 have no vacancies 118. For example, the user 102 may be attending a popular event at the destination 106, and the crowd of other attendees may have taken up most of the parking opportunities 116 near the destination 106. The user 102 may search extensively among such parking opportunities 116 without luck, and may spend considerable time doing so, particularly if numerous other attendees are also searching for parking opportunities 116. This process may delay the user 102 in parking the vehicle 104 and arriving at the destination 106, possibly by an extended duration. Moreover, the search may be frustrating to the user 102, e.g., if the first ten or twelve parking opportunities 118 have no vacancies 118. In extreme cases, the delay may cause the user 102 to miss an event at the destination 106 entirely, or frustration may cause the user 102 to abandon the search and decide against visiting the destination 106.

As a second example, the user's anticipation of frustration may prompt the user 102 to utilize heuristic strategies that lead to disadvantageous results. As one strategy, the user 102 may anticipate the scarcity of vacancies 118 upon approaching the destination 106, and may therefore select the first vacancy 118 that the user sees 102, which may be relatively far away from the destination 106 that entails a long walk and possibly a long delay. Alternatively, the user 102 may select a high-priced parking spot that is above the user's desired price point. However, if the estimation of the user 102 was incorrect and vacancies 118 in parking opportunities 116 were in fact ample, the user 102 may even pass a number of closer and/or more affordable vacancies 118 between the parked vehicle 104 and the destination 106, which may amplify the user's frustration.

As a third example, the user 102 may be highly distracted during the search for parking, e.g., due to switching attention rapidly among the tasks of looking at the navigation device of the vehicle 104; looking for the indicated parking opportunities 116 and vacancies 118 arising there; and deciding where next to search for parking opportunities 116—all while driving the vehicle 104 in a potentially unfamiliar location with dynamic stop-and-go traffic. The risks of distracted driving may therefore be compounded by the additional burden to the user 102 of personally coordinating the search and visual location of parking opportunities 116 and vacancies 118, and may exacerbate the risks of violating traffic laws and/or causing a collision with another vehicle, a cyclist, or a pedestrian.

These and other disadvantages may arise from conventional navigation techniques that assist the user 102 with navigating to the destination 106 and optionally identifying nearby parking opportunities 116. While perhaps more helpful than completely unassisted navigation, these navigation assistance techniques may be exhibit deficiencies due to the limited value of the information presented to the user 102. That is, while the navigation device may inform the user of the locations of parking opportunities, the navigation device may be poorly configured to present recommendations to the user 102—or, at most, may provide recommendations that are of only limited value, such as recommending the six closest parking opportunities sorted in order of proximity to the destination 106. This information may be unhelpful to the user 102, and indeed even counterproductive, if the recommended parking opportunities 116 have no vacancies 118. This limitation may be exacerbated by the unavailability of up-to-the-minute information about vacancies 118 at the parking opportunities 116; e.g., many parking opportunities 116 may not provide information about whether or not vacancies 118 currently exist. Moreover, even where such reports are available, vacancies 118 are often quite ephemeral; e.g., since vacancies 118 at curbside parking may last only a few seconds, active notifications to the user 102 of actual vacancies 118 may be present numerous false positives that amplify the user's frustration and further delay the securement of a vacancy 118. For at least these reasons, the highly dynamic nature of vacancies 118 of parking opportunities 116 may limit the capability of conventional navigation devices to provide meaningful assistance to the user 102 in locating vacancies 118 in parking opportunities 116 near the destination 106.

B. Presented Techniques

The currently presented techniques utilize a different approach to assisting users 102 in locating vacancies 118 in parking opportunities 116 near a destination. These approaches involve a probabilistic evaluation of the parking opportunities 116, e.g., a determination of the likelihood that vacancies 118 exist for respective parking opportunities 116. As an example, a vehicle navigation service may collect information about the frequency with which users 102, en masse, find vacancies 118 in various parking opportunities 116 over a range of circumstances, such as at different times of day; on different days of the week; and in response to various conditions, such as various kinds of weather and local events. The recording of metrics over various periods of time, for a potentially large number of users 102 and/or vehicles 104, may provide a basis for informed predictions of the likelihood that a particular parking opportunity 116 may have a vacancy 118 at a particular time.

Figure 2:
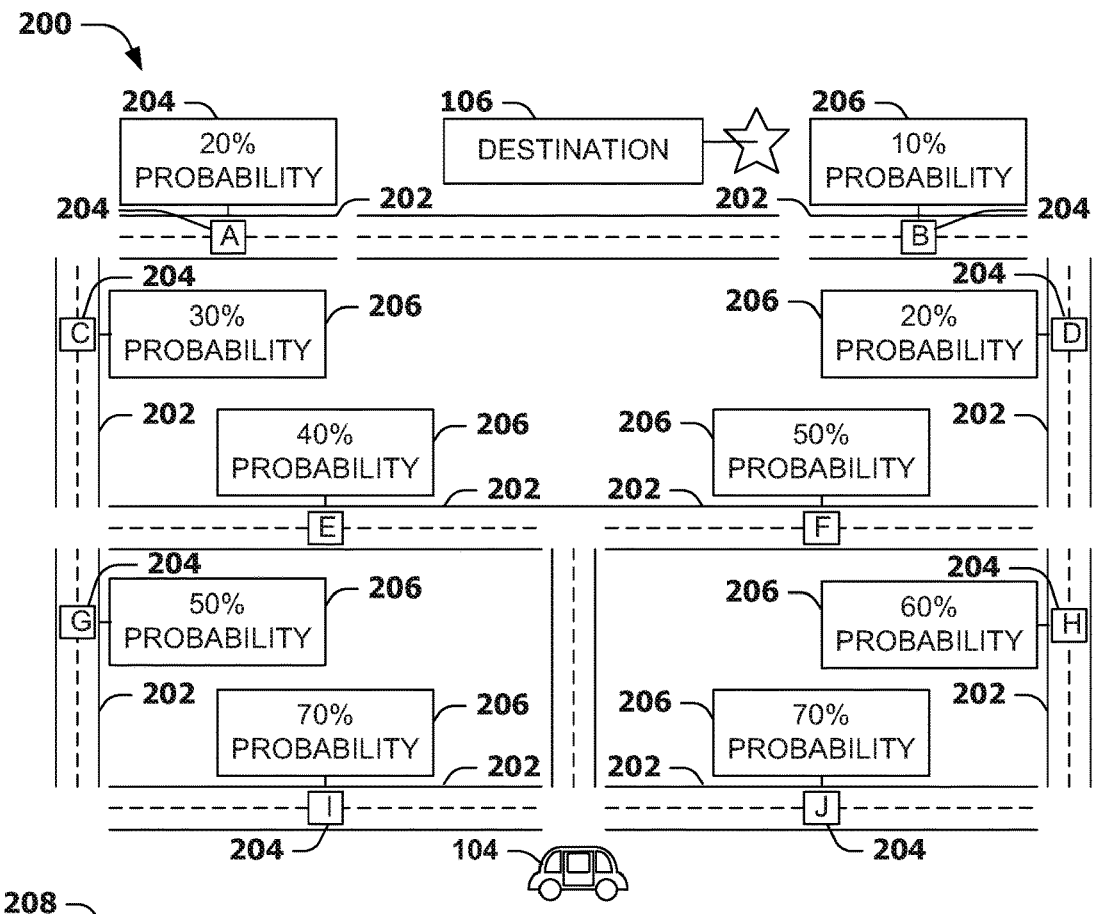
FIG. 2 is an illustration of an exemplary scenario featuring a probabilistic assessment of parking opportunities to identify a parking route that promotes the securement of parking a vehicle near a destination in accordance with the techniques presented herein.

FIG. 2 is an illustration of an example scenario 200 featuring an application of probabilistic in order to assist a user 102 of a vehicle 104 in finding parking near a destination 106 in accordance with the techniques presented herein. In this example scenario 200, the vehicle 104 is approaching the destination 106 that is within proximity of a variety of parking opportunities 204 that may have vacancies 118, but the current existence of vacancies 118 at the specific parking opportunities 204 may be difficult to determine. Instead, the probability 206 of a vacancy 118 at the respective parking opportunities 204 may be determined, and a set of routes 210 in the vicinity of the destination 106 may be generated, respectively, as a sequence of segments 202 that present parking opportunities 204. The route parking probabilities 212 may be compared to identify the route 210 that presents a highest probability among the routes 210, based on an aggregation of the individual probabilities 206 of the respective parking opportunities 204 for each route 210, in order to present a recommendation 216 of a route 210 for the user 102 to follow that is likely to maximize the probability of finding a vacancy 118 near the destination 106.

As illustrated in the example scenario 200 of FIG. 2, a state search 208 may be performed over navigable segments 202 (e.g., sections of streets) in the general vicinity of the destination 106. The state search 208 may be organized, e.g., to begin with one or more segments 202 that is nearest the destination 106, such as Segments A and B. The state search 202 may branch outward to the other segments 202 connected to these segments 202 in order to identify routes 210 that may be navigated near the destination 106. For each route 210, a parking route probability 212 is calculated of finding parking at any of the parking opportunities 204 on the respective segments 202 of the route 210 (e.g., according to the inverse of the product of the probabilities of not finding a vacancy 118 at all of the parking opportunities 204 along the route 208). The routes 210 may be assembled outward from the destination 106 and sorted according to maximum walking distance 214 (e.g., the distance between the destination 106 and the furthest parking opportunity 204 along the route 210), and optionally limited to a maximum walking distance 214 that the user 102 of the vehicle 104 may be inclined to undertake. Upon completion of the state search 208, a route 210 that exhibits a high parking route probability 212 among all of the routes 210 may be selected as the parking route to be presented to the user 102 as a recommendation to navigate the vehicle 104 while searching for parking. The recommendation 216 may be presented in many ways, e.g., by substituting the parking route, starting with the current location of the vehicle 104, for the original route 110 to the destination 106; by appending the parking route to the original route 110 to the destination 106; and/or by displaying the parking route to the user 102 as a recommendation for a search path that may present an encouraging probability of finding a vacancy 118. In this manner, the techniques presented in the example scenario 200 of FIG. 2 facilitate the search of the user 102 for a parking vacancy 118 near the destination 106 of the route 110 in accordance with the techniques presented herein.

C. Technical Effects

A first technical effect that may be achieved by the techniques presented herein is the advancement of navigation systems to provide functionality that, in conventional navigation systems, is unavailable or is only available in a rudimentary form. Many conventional navigation systems provide no assistance with parking, thus failing to address a common need of users 102 of such systems. Some navigation systems may only identify nearby parking opportunities 116 but only in a relatively static manner, i.e., without regard to the capacity and/or vacancy 118 of such parking opportunities 116, which often misinforms the user 102 by presenting a recommendation that is unavailable to the user 102. which is often quite frustrating for the user 102 and wasteful of the user's time. Moreover, to compensate for the inaccuracy of such data, some navigation systems may provide an extensive set of information to the user 102 about nearby parking opportunities 116, but the volume of such information may simply overwhelm the user 102 with too many options. Such systems may seek to reduce the information and avoid information overload, but can only do so based on comparatively simplistic criteria, such as proximity to the destination 106. Such limitations may arise because the presentation of parking recommendations that reflect actual vacancies 118 may be quite difficult to achieve due to the characteristically volatile nature of parking, wherein vacancies 118 appearing and disappearing in a matter of seconds. In accordance with the present disclosure, a probabilistic approach to formulating parking recommendations based on probability—and, in general, based on an aggregation of parking route probabilities 212 for various routes 210 and the comparison of such aggregations among the respective routes 210, which provides more accurate predictions of vacancies 118 than the use of a single probability 206 for a single parking opportunity 204—substantially improves the accuracy of the recommendation 216.

A second technical effect that may be achieved by the techniques presented herein is a significant improvement in the safe operation of the vehicle 104. Distracted driving is well-recognized as a hazardous activity that endangers the lives of drivers, cyclists, and pedestrians, as well as presenting risks of damage due to avoidable collisions. When a user 102 is visually scanning an area to park near a destination 106, the user's attention is split between operating the vehicle, looking for parking opportunities 116 (e.g., signs that indicate public garages, public parking lots, parking meters, and the legality of streetside parking), and looking for vacancies 118 therein, as well as trying to decide where next to look for parking. The cognitive burden of these tasks may significantly increase the distractedness of the user's operation of the vehicle 104. Conventional navigation devices that provide a list of static locations of parking opportunities 116, with no information about vacancy 118, may modestly reduce the user's cognitive load and distractedness by pointing the user in the general direction of parking garages, but such modest improvement may be offset by the cognitive load of having to interact with the device (e.g., reading the list of parking opportunities 116, mentally comparing the options, and making a selection), which may have to occur repeatedly if the selected parking opportunities 116 present no vacancies 118. The distractedness of the user 102 may actually exhibit a net increase, since the modest assistance provided by the navigation system entails the cognitively expensive interaction with a device. By contrast, the interactions provided by the present techniques may be both reduced—e.g., by automatically comparing the routes 210, automatically formulating a recommendation 216, and automatically updating the route of the user 102 to include the selected parking route—and also more successful at enabling the user 102 to find parking rapidly, thus reducing the duration of the distracted driving and the number and complexity of interactions between the user 102 and the navigation system. In this manner, the presented techniques may significantly reduce the distracted driving risks that are associated with navigation systems in the particular, and heretofore poorly met, task of facilitating parking.

A third technical advantage that may be achieved by the techniques presented herein involves a reduction in the duration of the operation of the vehicle 104 by promoting the probability of finding vacancies 118 in parking opportunities 116. When a user 102 is having difficulty finding parking near a destination 106 (e.g., due to a conventional navigation system that presents a static list of parking opportunities 116 that have no vacancies 118), the extended presence of the vehicle 104 in the vicinity of the destination 106 contributes to the magnitude of traffic. That is, the user's inability to find a vacancy 118 of a parking opportunity 116 extends the duration of the vehicle 104 on the streets by the destination 106 and adds to the traffic volume, which in turn delays other people from finding parking or even just driving past the destination 106. The exacerbation of traffic presents a host of efficiency problems, such as wasted fuel and delays in travel for anyone near the destination 106, as well as increases in pollution. The techniques presented herein therefore promote many kinds of efficiency through the recommendation 216 of high-probability parking routes that may enable the user 102 to park the vehicle 104 sooner, thereby reducing the traffic population. While the use of such techniques by one user 102 of one vehicle 104 may not be particularly significant, the aggregate efficiency advantage of many users 102 utilizing probabilistic parking techniques to park many vehicles 104 sooner may enable a highly significant reduction of traffic volume near the destination 106. Many such technical effects may be achievable through the facilitation of parking in accordance with the techniques presented herein.

D. Exemplary Embodiments

Figure 3:
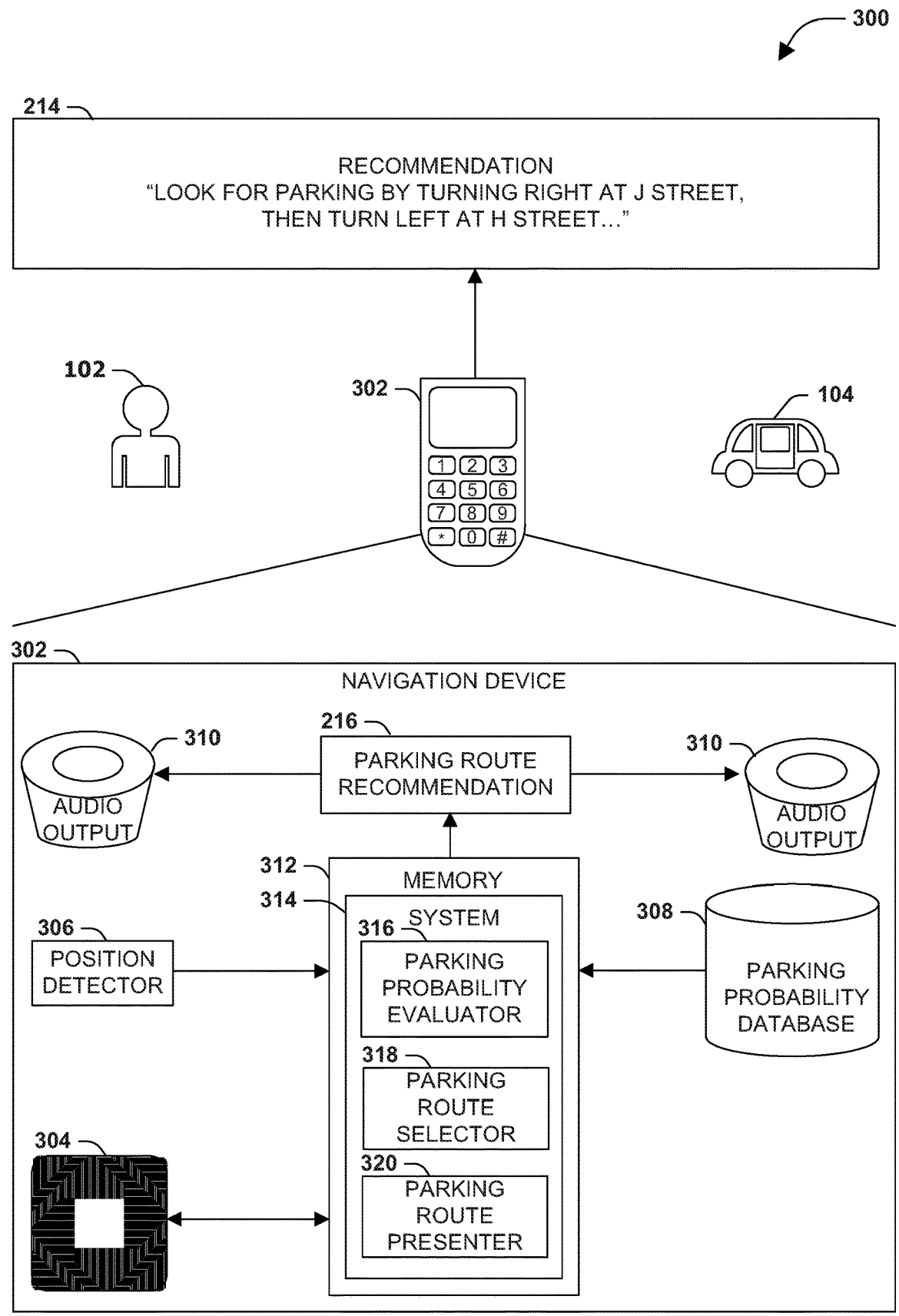
FIG. 3 is a component block diagram of an example device featuring an example system that promotes the securement of parking a vehicle near a destination in accordance with the techniques presented herein.

FIG. 3 presents an illustration of an exemplary scenario 300 featuring a first exemplary embodiment of the techniques presented herein, illustrated as an example navigation device 302 storing and utilizing an example system 314 for facilitating a user 102 in finding parking for a vehicle 104. The example navigation device 302 stores or has access to a parking probability data source 308, such as a database that indicates respective parking opportunities 116 and the probabilities 206 of vacancies 118 therein, as well as a position detector 306 that detects a location of the vehicle 104 (e.g., a GPS receiver) and audio output 310 that enables the example navigation device 302 to present a recommendation 214 to the user 102. The example system 314 may be implemented, e.g., on an example navigation device 302 having a processor 302, and may be integrated with the vehicle 104, as a portable or mounted device used by the user 102 while riding in the vehicle 104, and/or as a wearable device of the individual 102, or a combination thereof. Respective components of the example system 304 may be implemented, e.g., as a set of instructions stored in a memory of the example navigation device 302 and executable on the processor 304, such that the interoperation of the components causes the navigation device 304 to operate according to the techniques presented herein.

The example system 304 comprises a parking probability evaluator 316 that identifies parking probabilities 206 of vacancies 116 at the respective paring opportunities 118. The example system 304 further comprises a parking route selector 318 that identifies a set of routes 210 near a destination 106, where the respective routes 210 comprising a sequence of segments 202. The parking route selector 318 also evaluates the respective routes 210 near the destination 106 by aggregating the parking probabilities 206 of the parking opportunities 116 along the segments 202 of the route 210 (as identified by the parking probability evaluator 316) to identify a parking route probability 212 for the route 210, and compares the parking route probabilities 212 of the respective routes 210 to select a parking route. The example system 314 further comprise a parking route presenter 320 that presents a recommendation 214 of the selected parking route to the user 102. In this manner, the interoperation of the components of the example system 314 enables the example navigation device 302 to facilitate the user 102 in the task of parking the vehicle 104.

Figure 4:
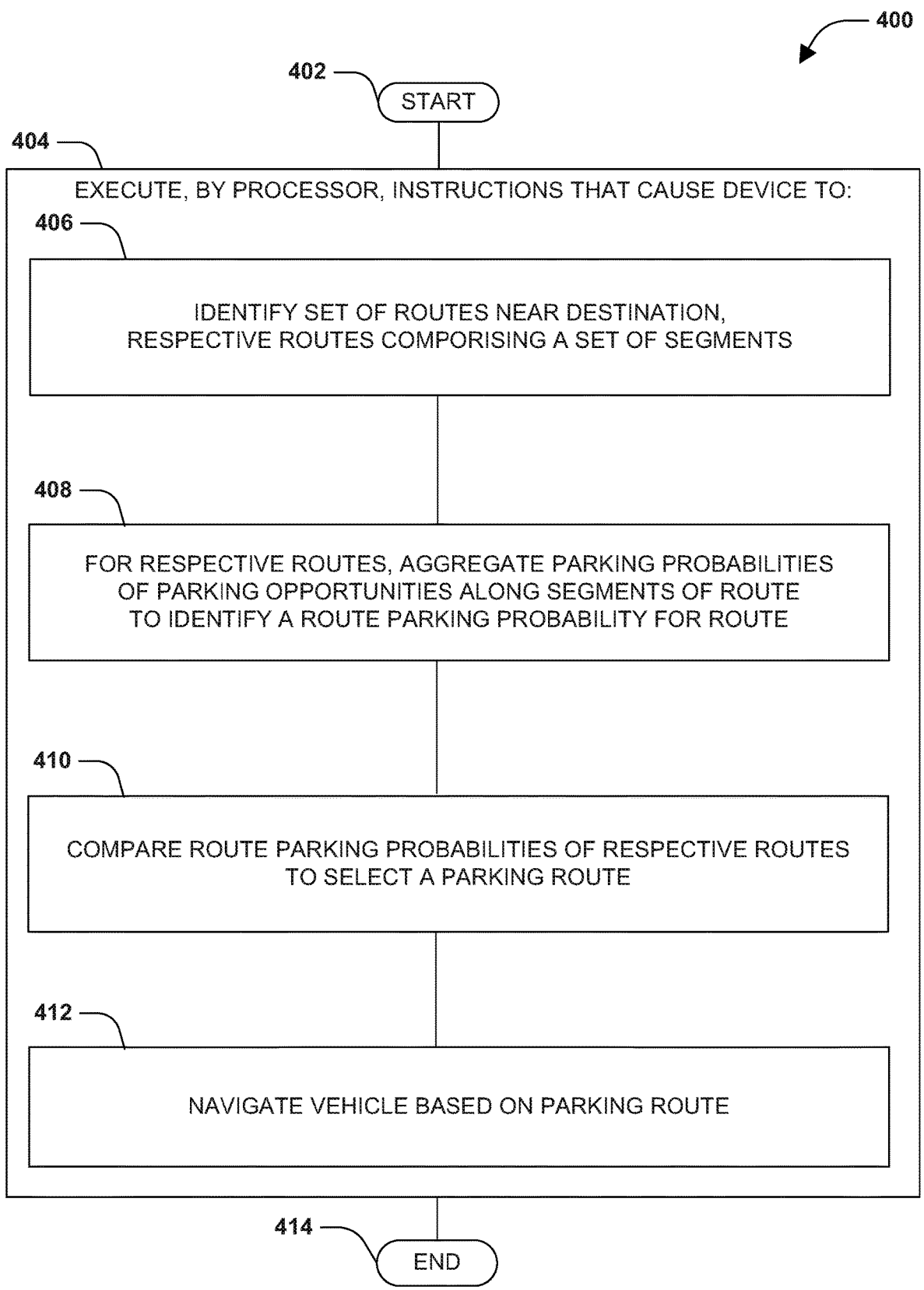
FIG. 4 is a flow diagram illustrating an exemplary method of navigating a vehicle to park near a destination in accordance with the techniques presented herein.

FIG. 4 presents a third example embodiment of the techniques presented herein, illustrated as an example method 400 of navigating a vehicle 104 to park near a destination 106, such as an autonomous vehicle 104 that is operated wholly or partly by a control system rather than a user 102. The example method 400 may involve a navigation device having a processor 304, and may be implemented, e.g., as a set of instructions stored in a memory component of a device (e.g., a memory circuit, a platter of a hard disk drive, a solid-state memory component, or a magnetic or optical disc) that, when executed by the processor of the device, cause the navigation device to perform the techniques presented herein.

The example method 400 begins at 402 and involves executing 404 the instructions on the processor 304. Specifically, execution of the instructions causes the navigation device to identify 406 a set of routes 210 near the destination 106, where the respective routes 210 comprise a sequence of segments 202. Execution of the instructions further causes the navigation device to, for the respective routes 210, aggregate 408 the parking probabilities 206 of parking opportunities 204 along the segments 202 of the route 210 to identify a parking route probability 212 for the route 210. Execution of the instructions further causes the navigation device to compare 410 the parking route probabilities 206 of the respective routes 210 to select a parking route. Execution of the instructions further causes the navigation device to navigate 412 the vehicle 104 based on the parking route. By navigating the vehicle 104 according to the selected parking route, the example method 400 facilitates the autonomous navigation of the vehicle 104 in accordance with the techniques presented herein, and so ends at 414.

Figure 5:
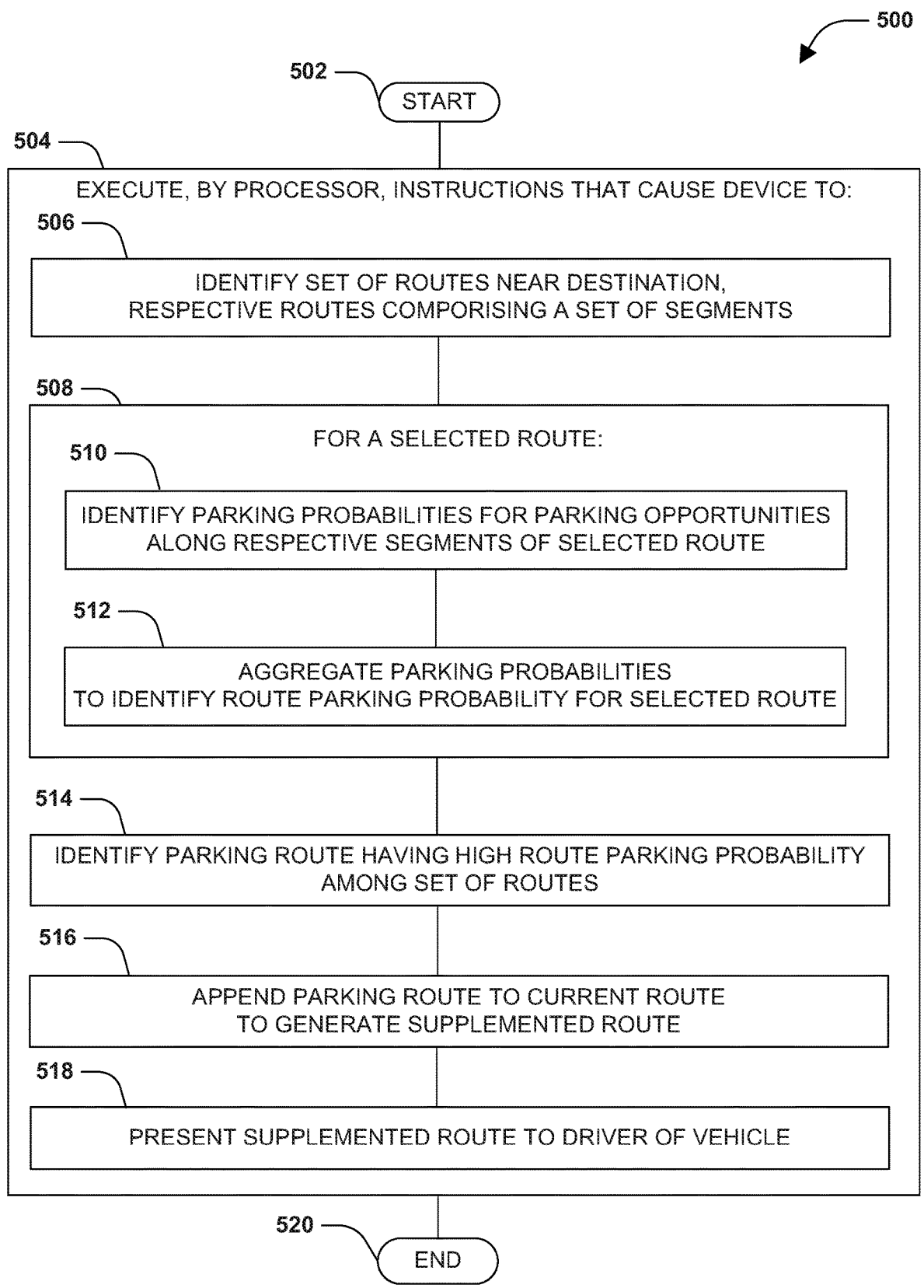
FIG. 5 is a flow diagram illustrating an example method of assisting a driver of a vehicle traveling along a current route to a destination in accordance with the techniques presented herein.

FIG. 5 presents a fourth example embodiment of the techniques presented herein, illustrated as an example method 500 of assisting a driver of a vehicle 104 with the task of parking near a destination 106. The example method 500 may involve a navigation device having a processor 304, and may be implemented, e.g., as a set of instructions stored in a memory component of a device (e.g., a memory circuit, a platter of a hard disk drive, a solid-state memory component, or a magnetic or optical disc) that, when executed by the processor of the device, cause the navigation device to perform the techniques presented herein.

The example method 500 begins at 502 and involves executing 504 the instructions on the processor 304. Specifically, execution of the instructions causes the device to identify 506 a set of routes 210 directed outward from the destination 106, where the respective routes 210 comprise a set of segments 202. Execution of the instructions further causes the device to, for a selected route 508, identify 510 parking probabilities 206 for parking opportunities 204 along respective segments 202 of the selected route 508, and aggregate 512 the parking probabilities 206 to identify a parking route probability 212 of the selected route 508. Execution of the instructions further causes the device to identify 514 a parking route that has a high parking route probability 212 among the set of routes 210. Execution of the instructions further causes the device to add 516 the parking route to the current route 110 to generate a supplemented route. Execution of the instructions further causes the device to present 518 the supplemented route for the driver of the vehicle. By assisting the user 102 in navigating the vehicle 104 according to the selected parking route, the example method 500 facilitates the operation of the vehicle 104 in accordance with the techniques presented herein, and so ends at 518.

Still another embodiment involves a computer-readable medium comprising processor-executable instructions configured to apply the techniques presented herein. Such computer-readable media may include, e.g., computer-readable storage media involving a tangible device, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein. Such computer-readable media may also include (as a class of technologies that are distinct from computer-readable storage media) various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein.

Figure 6:
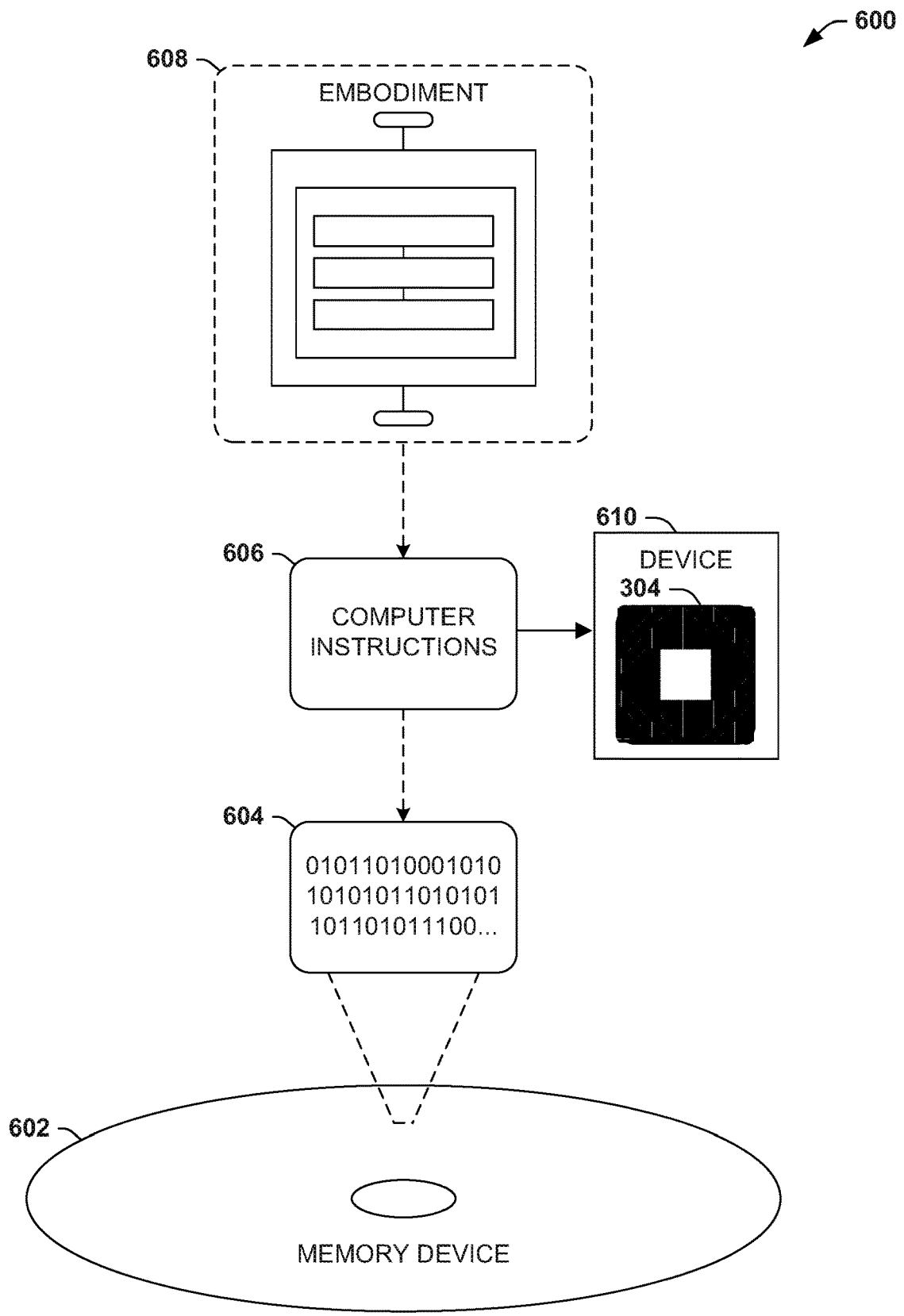
FIG. 6 is an illustration of an example computer-readable medium comprising processor-executable instructions configured to embody one or more aspects of the techniques presented herein.

An exemplary computer-readable medium that may be devised in these ways is illustrated in FIG. 6, wherein the implementation 600 comprises a computer-readable medium 602 (e.g., a CD-R, DVD-R, or a platter of a hard disk drive), on which is encoded computer-readable data 604. This computer-readable data 604 in turn comprises a set of computer instructions 606 configured to operate according to the principles set forth herein. In a first such embodiment, the processor-executable instructions 606 may be configured to, when executed by a processor 612 of a device 610, cause the device 610 to implement one or more components of a system \ for facilitating an individual 102 in the parking of a vehicle 104, such as the exemplary system 314 of FIG. 3. In a second such embodiment, the processor-executable instructions 606 may be configured to, when executed by a processor 612 of a device 610, cause the device 610 to perform a method of navigating an autonomous vehicle 104 to park near a destination 106, such as the example method 400 of FIG. 4. In a third such embodiment, the processor-executable instructions 606 may be configured to, when executed by a processor 612 of a device 610, cause the device 610 to perform a method of facilitating an individual 102 in the task of finding parking for a vehicle 104 near a destination 106, such as the example method 500 of FIG. 5. Some embodiments of this computer-readable medium may comprise a nontransitory computer-readable storage medium (e.g., a hard disk drive, an optical disc, or a flash memory device) that is configured to store processor-executable instructions configured in this manner. Many such computer-readable media may be devised by those of ordinary skill in the art that are configured to operate in accordance with the techniques presented herein.

E. Variations

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the example navigation device 302 and/or example system 314 of FIG. 3; the example method 400 of FIG. 4; the example method 500 of FIG. 5; and the exemplary computer-readable storage device 602 of FIG. 6) to confer individual and/or synergistic advantages upon such embodiments.

E1. Scenarios

A first aspect that may vary among embodiments of these techniques relates to the scenarios wherein such techniques may be utilized.

As a first variation of this first aspect, the techniques presented herein may be utilized in many types of vehicles 104, such as bicycles ridden by users 102; automobiles driven on a roadway; watercraft operated on a waterway; trains operated on a railway; trucks operated in a trucking facility, and construction equipment operated in a construction zone. The parking opportunities 116 within such scenarios may also vary; e.g., parking opportunities 116 for automobiles may include parking garages, parking lots, and curbside parking, while parking opportunities 116 for watercraft may include a public dock. The techniques may also be applied to various types of users 102 in the operation of such vehicles 104 (e.g., pilots, navigators, and operators of supplemental vehicle equipment). The techniques may also be used to assist with the navigation of wholly or partly autonomous vehicles 104 that perform navigation tasks, including finding parking near a destination 106, with little or no assistance from the user 102. Additionally, the embodiment may be implemented on a variety of devices, such as navigation systems integrated with the vehicle 104; mobile devices such as phones or tablets; and wearable devices. As a still further variation, the techniques may be utilized with many types of routing. In some scenarios, the destination 106 may comprise the current location of the vehicle 104 (e.g., a "find parking near me" feature).

As a second variation of this first aspect, an embodiment of the presented techniques may utilize a variety of architectures. As a first example, the techniques may be applied on a single device or across multiple devices, including a cloud-based technique in which a remote server identifies the parking route for a vehicle 104 and a device within the vehicle 104 presents the parking route to the user 104 (e.g., where the parking probability evaluator 316 and the parking route selector 318 are provided on a server, and the parking route presenter 320 is provided on a user device). As a second example, the parking probability data source 308 may be wholly or partly located on the device (e.g., a database that is stored on a navigation system, typically with periodic updates of the parking opportunities 204 and probabilities 206), and/or may be wholly or partly located on a second device and accessed by the device implementing the techniques presented herein (e.g., a server providing a service that is accessed over a wireless connection). As a third example, the techniques presented herein may be provided for a single user 102 and single vehicle 104, or may coordinate the parking of multiple vehicles 104 and/or multiple users 102, in a centralized manner (e.g., a server that identifies and distributes parking routes 210 for a set of vehicles 104) and/or a decentralized manner (e.g., a collaborative, peer-to-peer inter-vehicle system that promotes parking all of the vehicles in a particular area). Many such scenarios may provide opportunities for facilitating the task of finding parking for a vehicle 104 in accordance with the techniques presented herein.

E2. Parking Probability Determination

A second aspect that may vary among embodiments of the techniques presented herein involves the estimation of parking probabilities 206 of respective parking opportunities 204.

As a first variation of this second aspect, a device may be provided that tracks the locations of vehicles 104, including the frequency and durations with which the vehicles 104 park in various parking opportunities 204. Extrapolated from a sample size to a large population of vehicles 104, the tracking may be sufficient to determine the typical occupation, and conversely vacancy 118, of the parking opportunity 204 at various times. For example, a segment 202 of a road may include a parking lot with 12 parking spots, and a population of vehicles that is estimated to represent 0.01% of the local vehicle population spends, collectively, an average of 50 minutes parked in the parking lot per month. Extrapolating to the entire population of vehicles 104 (50 minutes/month/0.0001/43,200 minutes per month) indicates that 11.57 of the 12 parking spots are continuously occupied, or a 3.5% likelihood of a vacancy 118 at any particular time.

As a second variation of this second aspect, a device that tracks the locations of vehicles may determine the frequency with which users 102 who are navigating a vehicle 104, and who appear to be searching for parking in a particular destination 106, select various parking opportunities 204. A device that has access to a parking probability data source 308 may receive a parking report from a second vehicle 104 for a selected segment, and may store, in the parking probability data source 308, a segment parking probability for the selected segment according to the parking report.

For example, when a vehicle 104 is routed to a destination 106, the path of the vehicle 104 may be tracked to determine occasions in which the user 102 encounters a parking opportunity 204, such as driving slowly past a row of curbside meters or entering a parking lot, and the frequency with which the user 102 successfully parks the vehicle 104 at the parking opportunity 204, e.g., the frequency with which a user 102 who expresses an interest in parking in the parking opportunity 204 ends up successfully parking there. It may be appreciated that such choices may be informed by other factors, such as the cost of parking and the delay or difficulty in finding a vacancy 118, but the impact of such factors may be discounted (e.g., by comparing the frequency of users' selection of the parking opportunity 204 with similarly priced parking opportunities 204 in the same vicinity). The frequency with which users 102 who attempt to park in a particular parking opportunity 204 successfully find a vacancy 118 may be extrapolated to a general indication of vacancy 118 of the parking opportunity 204. Alternatively, users 102 may expressly indicate the vacancy 118 or occupancy of parking opportunities 204, e.g., by fulfilling a query by the navigation system.

As a third variation of this second aspect, information about vacancies 118 of parking opportunities 204 may be collected directly from administrators of the parking opportunities. As a first example, a manager of a parking garage may periodically report the occupancy and/or vacancy 118 of the parking garage. As a second example, an automated system may track the current vacancy 118 and/or occupancy of a parking garage (e.g., a parking garage with 80 parking spots may count the number of entering and exiting vehicles, and may compare the current count with the capacity to determine whether the parking garage is at capacity or has at least some vacancies 118).

As a fourth variation of this second aspect, information about vacancies 118 of parking opportunities 204 may be directly reported by vehicles 104. A device storing or having access to a parking probability data source 308 may receive a parking report indicating, from a second vehicle 104, a parking opportunity notification for a selected segment (e.g., an indication of vacancy 118 and/or occupancy), and may identify the parking route probability of routes comprising the selected segment according to the parking opportunity notification. As a first such example, a particular parking opportunity 204, such as a single curbside parking meter, may be monitored for occupation by any vehicle 104 of a population of tracked vehicles 104. When one such vehicle 104 parks in the parking opportunity 204, the probability 206 of the vacancy 118 may be reduced to 0%; and when the vehicle 104 departs the parking opportunity 204, the probability 206 of the vacancy 118 may be instantaneously increased to 100% (as the certainty of its vacancy 118 is, at least momentarily, certain). Alternatively, if a user 102 who is actively seeking parking declines the particular parking opportunity 204, the probability 206 of the vacancy 118 may be reduced to 0%. Because parking is characteristically volatile and the population of tracked vehicles 104 is rarely complete, in the absence of further information about the vacancy 118 of the parking opportunity 204, its probability 206 may decay over time toward a typical probability 206. The rate of decay may be upward (e.g., when a user 102 declines a parking opportunity 204 due to inferred occupancy, the probability 206 may be reduced, but may increase toward a typical probability 206 in the absence of further information) or downward (e.g., when a vehicle 104 vacates a parking opportunity 204, the vacancy may momentarily be very high, but may decay toward a typical probability 206 on the presumption that the vacancy 118 is likely to be filled by a non-tracked vehicle 104). Moreover, the rate of decay for respective parking opportunities 206 may be based on factors such as demand (e.g., highly desirable parking spots that are near the entrance of a destination 106 may exhibit rapid decay of the probability 118 of vacancy 118, while parking spots that are further from the destination 106, such as upper floors of a parking garage or spots near the back of a parking lot, may exhibit gradual decay of the probability 206 of vacancy 118).

As a second such example, a segment 202 of a road featuring curbside parking meters, vehicles 104 passing the segment 202 may visually inspect the individual parking opportunities 204 to detect vacancy 118 and/or occupancy. Such detection may be performed for vehicles 104 driven by users 102 who are not interested in parking at the parking opportunity 204 but are merely passing by, including users 102 who are traveling to distant destinations 106 but who coincidentally drive past the parking opportunity 204.

As a fifth variation of this second aspect, information about vacancies 118 of parking opportunities 204, such as a parking probability data source 308, may be partitioned in various ways to account for different probabilities 206 in different circumstances. Such variations include: tracking probability 206 for various days (e.g., different probabilities 206 of vacancy 118 on weekdays vs. weekend); various times of day (e.g., different probabilities 206 of vacancy 118 during business or peak hours vs. off-hours); various times of the month (e.g., different probabilities 206 of vacancy 118 of a shopping mall parking lot near shopping holidays vs. during usual times); for various types of weather (e.g., different probabilities 206 of vacancy 118 of an open-air parking lot for nice days vs. rainy or snowy days); and/or with respect to various events (e.g., different probabilities 206 of vacancy 118 of a parking lot near a sports stadium during a sports game vs. other times). The partitioning may include various levels of granularity (e.g., for a parking lot near a stadium, probability 206 of vacancy 118 may be tracked with coarse granularity, such as game days vs. non-game days, or fine granularity, such as 30-minute increments throughout the course of a game). When used in the techniques presented herein, the probability 206 at any particular instant may be identified according to the current circumstances, e.g., by identifying the current day, time of day, and weather conditions, and retrieving the corresponding probability 206 from a parking probability data source 308. Further examples of the types of information upon which the probabilities 206 of vacancy 118 may be determined are provided, e.g., in U.S. patent application Ser. No. 13/591,665 ("Predictive Parking"), the entirety of which is hereby incorporated by reference as if fully rewritten herein.

As a sixth variation of this second aspect, the evaluation of parking opportunities 204 and vacancies 118 therein may include a number of other factors. As a first such example, a parking probability data source 308 may include information about restrictions placed upon such parking opportunities 204, such as neighborhood residence; loading zones; legal and illegal parking times; vehicle size or type restrictions, such as parking only for compact vehicles or electric vehicles; and permit requirements, such as handicapped zones. This information may be used to establish the prediction of probabilities 206 (e.g., parking near an event may be generally crowded, but a restricted spot for electric vehicles may have a greater probability 206 of vacancy 118) and/or may be used to adjust the consideration of the parking opportunity 204 for the parking routes based on the circumstances of the user 102 and the vehicle 104 (e.g., a parking opportunity 206 that is reserved for electric vehicles may be included or excluded based on whether the user 102 is driving an electric vehicle 104).

Figure 7:
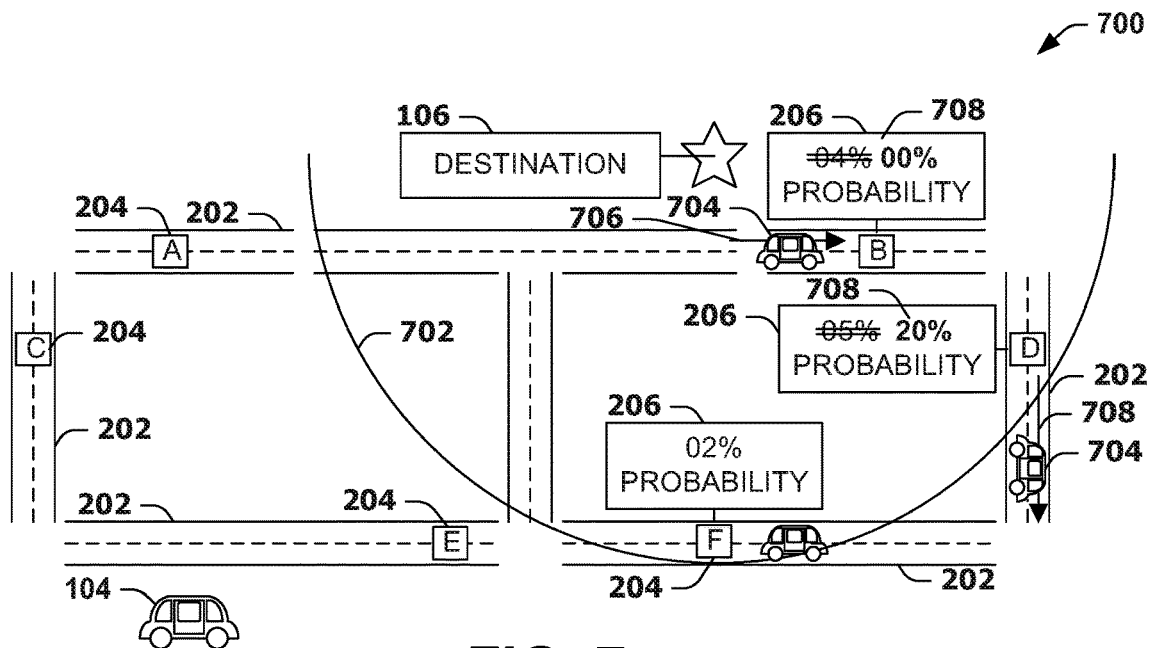
FIG. 7 is an illustration of an example scenario featuring a set of variations in determining the probabilities of parking opportunities near a destination in accordance with the techniques presented herein.

FIG. 7 is an illustration of an example scenario 700 featuring the determination of parking probabilities 206 of vacancies 118 of parking opportunities 204. In this example scenario 700, a vehicle 104 is traveling to a destination 106, and an embodiment of the currently presented techniques endeavors to identify a parking route 210 to recommend to the user based on a probabilistic determination in accordance with the techniques presented herein. To do so, the embodiment may first identify the parking opportunities 206 within a maximum walking distance 702 from the destination 106. For the respective parking opportunities 204, a data source 308 may be consulted to determine the probability 206 of finding a vacancy 118 at the parking opportunity 204 (optionally conditioned based on current circumstances, such as the time of day, the day of the week, and/or the occurrence of an event at the destination 116). Additionally, the probabilities 206 may be updated based on live data, such as a first notification of a vehicle 704 arriving 706 at a vacancy 118 at the "B" parking opportunity 204 and a second notification of a second vehicle 704 departing 708 the "D" parking opportunity 204. The live notifications may be factored into the comparison of routes 210 by Many such techniques may be utilized to estimate the probability 206 of a vacancy 118 of a parking opportunity 204 in accordance with the techniques presented herein.

E3. Probability Filtering and Weighting

A third aspect that may vary among embodiments of the techniques presented herein involves weighting the parking probabilities 206 of various parking opportunities 204 to reflect the desirability of selecting the parking opportunity 204 as a recommendation to the user 102. While some variations of the presented techniques may only utilize the parking probabilities 206, other variations may take into account various factors that indicate whether or not the user 102 would like to choose the parking opportunity 204 if a vacancy 118 exists. In some cases, the adjustment may involve filtering the parking opportunities 204, such as excluding parking opportunities 204 that are not to be considered viable options for parking the vehicle 104. In other cases, the adjustment may involve weighting a parking probability 206 of a parking opportunity 204 to account for its desirability relative to other parking opportunities 204. For example, a device may, for respective segments 202, identify a preference score for parking the vehicle 104 in the respective parking opportunities 204 along the segment 202, and weight the parking route probabilities 212 according to the preference scores of the parking opportunities 204 of the respective segments 202 of the parking route 210.

For example, a naïve technique may determine that the parking route probability 212 of a first parking route 210 is 5% higher than the parking route probability 212 of a second parking route 210. However, the vacancies 118 for the first parking route 210 may be determined to be further away and more costly than those of the second parking route 210. Therefore, the user 102 may prefer to have the second parking route 210 recommended instead of the first parking route 210 as long as the parking route probability 212 of the second parking route 210 is not significantly lower than that of the first parking route 210; but if the parking route probability 212 of the second parking route 210 is significantly lower, the user 102 may prefer to have the first parking route 210 recommended despite the distance and cost. Such preferences may be taken into account by weighting the individual parking probabilities 206, and by extension the parking route probabilities 212 of the respective parking routes, to account for the user's preferences and relative desirability of the parking opportunities 204.

As a first variation of this third aspect, the parking probabilities 206 and parking route probabilities 212 may be adjusted to account for distance from a destination 106. For example, a user 102 may specify a maximum tolerable distance from the destination 106 (e.g., a maximum distance that the user 102 is willing or able to walk at one time), and the parking opportunities 206 considered by the state search 208 may be limited to a maximum walking distance 214 from the destination 106. Alternatively or additionally, the parking probabilities 206 of respective parking opportunities 204 may be weighted proportionally to the proximity to the destination 106, e.g., increasing the parking probability 206 for desirable parking opportunities 204 that are near the destination 106 and decreasing the parking probability 206 for desirable parking opportunities 204 that are far away from the destination 106. In some cases, the preference score may be calculated proportionally to a proximity of the respective parking opportunities 204 to the destination 106.

As a second variation of this third aspect, the parking probabilities 206 and parking route probabilities 212 may be adjusted to account for weather. As a first example, a user 102 may specify a requirement of parking indoors when the temperature is outside of a comfortable range, or for parking in a covered spot during inclement weather or intense direct sunlight. As a second example, the user 102 may simply prefer indoor or covered parking in such circumstances. Other factors that may affect the user's preferences include, as but a few examples: parking cost (e.g., a maximum parking fee that the user 102 is willing to pay, or an incremental disinclination to pay for parking); crime rates (e.g., a requirement or preference of the user 102 to park near a destination 106 in areas of comparatively high crime rates, and a willingness to walk further in safer areas); access to an electric vehicle charging station, which the user 102 may prefer if the vehicle 104 is capable of being electrically charged; and proximity to locations that the user 102 likes to visit or prefers to avoid. Some factors may be correlated and compounded (e.g., the user's range and/or preference for limiting walking distance may increase in times of bad weather or late at night). The parking opportunities 204 considered by the state search 208 may be filtered to account for the user's requirements, and/or the parking probabilities 206 may be increased or decreased to reflect the suitability of the parking opportunities 206 in view of the circumstances and the user's preferences. Such factors may be determined, e.g., according to an explicit specification of preferences by the user 102; according to a user profile of the user 102; and/or according to the past history of the user 102 and/or generalized trends in choices by a population of users 102.

As a third variation of this third aspect, the parking probabilities 206 and parking route probabilities 212 may be adjusted to account for vehicle type. For example, the vehicle 104 may comprise a vehicle that requires a particular type of parking, such as a bicycle, motorcycle, or oversized vehicle like a bus. Alternatively, a user 102 may simply prefer to park the vehicle 104 in certain locations; e.g., the user 102 of an electric vehicle 104 may prefer parking opportunities 204 with electric charging stations, may prefer to park a compact vehicle in a compact vehicle spot, or may prefer to park a large vehicle in more capacious parking opportunities 206. In such circumstances, the parking opportunities 204 considered by the state search 208 may be filtered to account for the user's requirements, and/or the parking probabilities 206 thereof may be weighted to reflect upward or downward the suitability of the parking opportunities 206 in view of the types of parking opportunities 206 and the user's vehicle 104.

As a fourth variation of this third aspect, the parking probabilities 206 may be adjusted to reflect the current circumstances of the user 102. For example, a schedule of a user 102 of the vehicle 104 may indicate a target arrival time at the destination 106, such as the starting time of an event or meeting that the user 102 wishes to attend. The filtering and/or weighting may therefore reflect the anticipated arrival time at the destination 106 if the user 102 is able to park in various parking opportunities 206. For example, a device may calculate a walking duration between the respective parking opportunities 204 and the destination 106, and adjust the filtering of parking opportunities 204 considered in a state search 208 and/or the weighting of the parking route probabilities 206 by the preference scores proportional to the proximity according to a current time, the walking duration, and the target arrival time at the destination 106.

As a fifth variation of this third aspect, the parking probabilities 206 may be adjusted to reflect the navigational complexity of navigating the segment 202 of the respective routes 206. For example, a first parking route 210 may take the user 102 past parking opportunities 204 that are more desirable and/or presenting a higher probability of vacancy 118 than those of a second parking route 210. However, the first parking route may include high-traffic areas, where the user 102 is more likely to be stuck in traffic and/or waiting for traffic signals, or a more difficult navigational process, such as cutting across several lanes of traffic in a short span. The parking route probability 212 of the first parking route 210 may therefore be reduced with respect to the second parking route 210 to account for the relative navigational complexities thereof.

As a sixth variation of this third aspect, the factors used to weight and/or filter the routes 210 may be taken into account in various ways. As a first such example, the factors may be applied as a threshold, such as a maximum walking distance that the user 102 is willing to walk between the parking opportunities 204 and the destination 106, based on the longest possible walk for each route 210. Alternatively, the factors may be applied as an average, e.g., adjusting the weighting of a route 210 based on the average walking distance of all of the parking opportunities 204 for the route 210, or based on the distance between the destination 106 and a midpoint of the route 210. As a second such example, a route may apply weighting to the probabilities 206 of the individual parking opportunities 204 for every route 210, or may adjust the route parking probability 212 based on an aggregation of the weighting factors for all parking opportunities 206 along the route 210.

Figure 8:
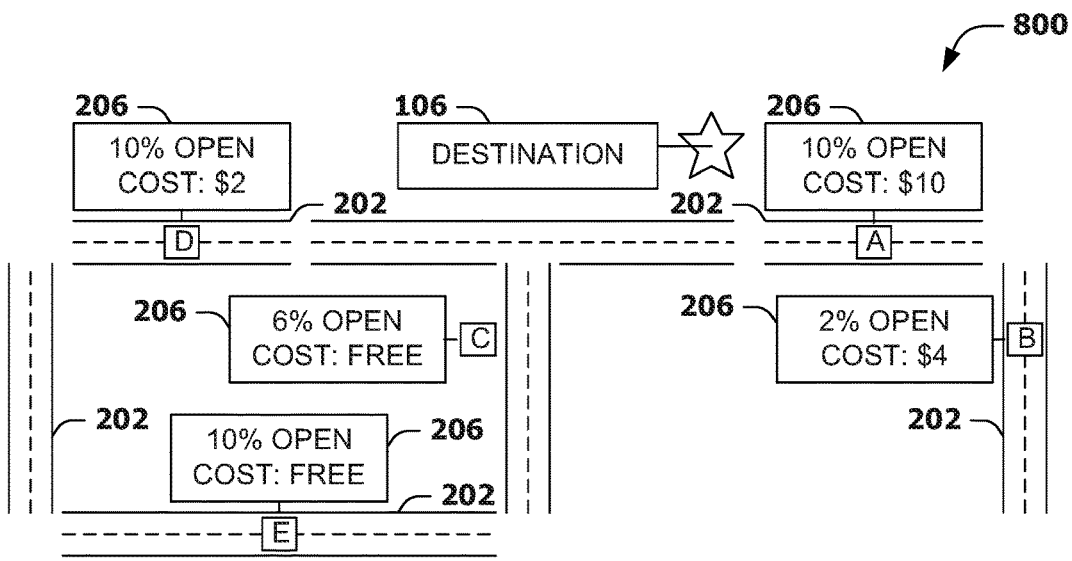
FIG. 8 is an illustration of an example scenario featuring a set of variations in evaluating the parking opportunities to choose a parking route in accordance with the techniques presented herein.

FIG. 8 is an illustration of an example scenario 800 featuring a weighting of parking opportunities 204 in accordance with the techniques presented herein. In the example scenario 800 of FIG. 8, a parking opportunities data source provides probabilities 212 of vacancies 118 for a set of parking opportunities 204. When selecting from the parking opportunities 204 to formulate and compare routes 210 for parking near a destination 106, an embodiment of the presented techniques may utilize some techniques to reflect the preferences of the user 102. As a first such example, if the user 102 does not wish to walk far between the destination 106 and the parking opportunity 206, a walking distance 214 may be estimated between the respective parking opportunities 204 and the destination 106, and the parking probabilities 212 may be inflated proportional to proximity and/or diminished proportional to distance. As a second such example, if the user 102 is disinclined to pay for parking, the respective parking opportunities 204 may be associated with a cost 802, and the probabilities 212 may be diminished proportional with the cost 802 of parking. The weighting may be applied as a probability score 804 that is calculated by adjusting the probability 212 upward or downward based on the selected factors, and the evaluation of routes 210 may then utilize the probability scores 804 rather than the unweighted probabilities 212. Many techniques may be utilized for accounting for the preferences and circumstances of the user 102 and matching such details with the parking opportunities 206 in accordance with the techniques presented herein.

E4. Parking Route Generation

A fourth aspect that may vary among embodiments of the techniques presented herein involves the generation and comparison of parking routes 210.

As a first variation of this fourth aspect, the parking routes 210 may be generated as a state search 208, beginning with segments 202 that are closest to the destination 106 and branching outward to connected segments 202. For example, a selected set of route start locations that are near the destination 106 may be identified, and parking routes may be identified that begin at a selected route start location and extend away from the destination 106. As another example, a parking route 210 may be initiated as a first segment that is near the destination 106, and the state search 20 may involve appending, to a previous segment 202 in the parking route 210, a next segment 202 that is connected with the previous segment 202. Variations of the A-Star algorithm may be utilized in which the cost functions utilize the walking distances and/or parking probabilities 206 of the respective parking opportunities 204 of the respective segments 202 of the respective parking routes 210.

As a second variation of this fourth aspect, the search may be filtered and/or limited based on various factors. As a first such example, the identification of parking routes 210 may be limited to parking routes 210 that comprise parking opportunities 204 with a maximum walking distance to the destination 106 that is within a walking distance threshold. As a second such example, the parking routes 210 considered and compared may be limited to parking routes 210 that present a parking route probability 212 that is above a parking route probability threshold (e.g., excluding parking routes 210 in which vacancies 118 are so improbable as to exclude the parking route 210 from consideration, no matter how desirable such parking may be).

As a third variation of this fourth aspect, in some parking routes, a particular dynamic segment 202 may exhibit a dynamic parking availability, e.g., a set of "five-minute maximum" parking spots that are likely to be occupied and vacated quickly. One or more of the parking routes 210 may include at least two instances of the dynamic segment 202, e.g., circling a block multiple times in case the dynamic parking opportunities 206 present an ephemeral vacancy 118.

As a fourth variation of this fourth aspect, the parking route search may be coordinated among vehicles, either in a centralized manner or a peer-to-peer manner. For example, if ten vehicles 104 are concurrently looking for parking in a particular area, it may be undesirable to route all ten vehicles 104 along the same parking route, as the failure of a first vehicle 104 to find parking along the parking route is likely to be similarly experienced by the other nine vehicles 104. Rather, it may be desirable to distribute the vehicles 104 over different parking routes 210 to maximize the probability of enabling all of the vehicles 104 to find parking. Accordingly, selecting the parking route 210 for a vehicle 104 may further comprise distributing the parking probabilities 206 of the parking opportunities 204 between the vehicle 104 and a second vehicle 104. Alternatively or additionally, the parking routes may be coordinated among vehicles 104; e.g., if a first vehicle 104 finds ample parking in a particular parking opportunity 206, other vehicles 104 may be routed toward the same parking opportunity 206.

As a fifth variation of this fourth aspect, the determination of a parking route probability 212 for a parking route 210 from the parking probabilities 206 of the individual parking opportunities 204 along the parking route 210 may be performed in numerous ways. FIG. 2 presents one such determination, in which the parking route probability 212 is the inverse of the probably that all parking opportunities 206 along the parking route 210 are occupied and have no vacancy 118. However, many statistical techniques, of varying complexity, may be utilized for such determination. Moreover, the parking route probabilities 212 may be determined in advance (e.g., for a particular destination 106, a parking probability data source 308 may store and provide routes that typically yield high probabilities of finding a vacancy 118 of a parking opportunity) and/or on an ad-hoc basis (e.g., when the user 102 requests a route 110 to a destination 106, and/or when the user 102 arrives at or approaches the destination 106).

As a sixth variation of this fourth aspect, the generation of routes 210 for consideration as a selected parking route 210 may be performed in a variety of ways. In many scenarios, a state search performed over a potentially large set of interconnected segments 202, such as a dense network of roads with parking near a destination 106, may present a large number of routes 210, even if limited to within a short walking distance of the destination 106. An exhaustive state search 208 of all such routes 210 may be performed via brute-force testing of each possible sequence of segments 202. However, an exhaustive state search 208 may delay the identification of a parking route 210 for recommendation, and/or may reduce the scalability of a service that provides parking route recommendations 216, e.g., because the fulfillment of each request for a parking route 210 may involve significant processing. An exhaustive state search 208 may also be inefficient, e.g., because many routes 210 may be rapidly eliminated from contention.

In view of such technical challenges, a variety of techniques may be utilized to limit the computational burden of performing the state search 208 over the possible sequences of segments 202.

As a first such example, rather than performing a state search over all possible sequences of segments 202, a variety of techniques may be utilized to limit the state search 208 in a heuristic and/or competitive manner. For example, if routes 210 are generated incrementally (e.g., by iteratively appending segments 202 to previously formed routes 210), the generation of routes 210 that are selected for further consideration may be reduced by excluding routes 210 that are unlikely to be part of the parking route 210 selected for recommendation. Such exclusion may involve, e.g., identifying and excluding routes 210 that do not significantly advance the route parking probabilities 212 with the addition of further segments 202; that have a route parking probability 212 below a threshold (optionally as a ratio of the route parking probability 212 to the length of the route 210); and/or that compare unfavorably to other routes 210 over a similar sequences of segments 204 and/or of similar lengths. Other factors may also be considered for keeping or excluding routes 210 for further consideration, such as the time and/or distance between the user's current location and the start of the route 210; the time and/or distance to navigate the route 210; the time and/or distance to navigate each segment 202, optionally compared with the number of parking opportunities 204 and/or vacancies 118 that may arise along the route 210; and the time to transition from a first segment 202 to a second segment 202, such as waiting at a traffic signal, traversing a high-traffic zone, or turning from one street onto another street.

As a second such example, the state search may be performed using a variety of machine learning techniques, such as a genetic algorithm that generates and compares routes 210 and that generates new routes 210 as combinations of the most favorable routes 210 so far identified. In some embodiments, the generation of such algorithms may involve a competitive process, e.g., a generation of routes through a genetic algorithm as a series of generations, where each epoch involves a comparison of the fitness of the collection of currently available routes 210, an elimination of routes 210 with fitnesses that compare poorly with other routes 210, and a hybridization that produces new routes 210 for evaluation in the next generation. The fitness in such techniques may utilize a variety of factors, including the cost functions discussed herein.

As a third such example, the total computational time of the state search 208 may be constrained to a duration threshold, and the embodiment may provide a recommendation 216 based on the parking route 210 with the highest route parking probability 212 and/or probability score 804 that was identified during the limited-time search.

As a fourth such example, caching may be utilized; e.g., if the parking probabilities data source 308 remains relatively static between a first query and a second query for parking routes 210 near a destination 106 at a particular time, the parking route 210 identified for the first query may be provided for the second query. In some instances, caching may present some undesirable side-effects (e.g., successive vehicles 104 routed through the same parking route 210 may experience lower probabilities of finding parking, particularly if the period between the queries is short). In other instances, caching may be a suitable strategy (e.g., users 102 may frequently request to find parking near a destination 106 such as a museum, and the probabilities 206 of the respective parking opportunities 204 may be substantially similar for a first query received at noon on Monday and a second query received at noon on Tuesday).

Figure 9:
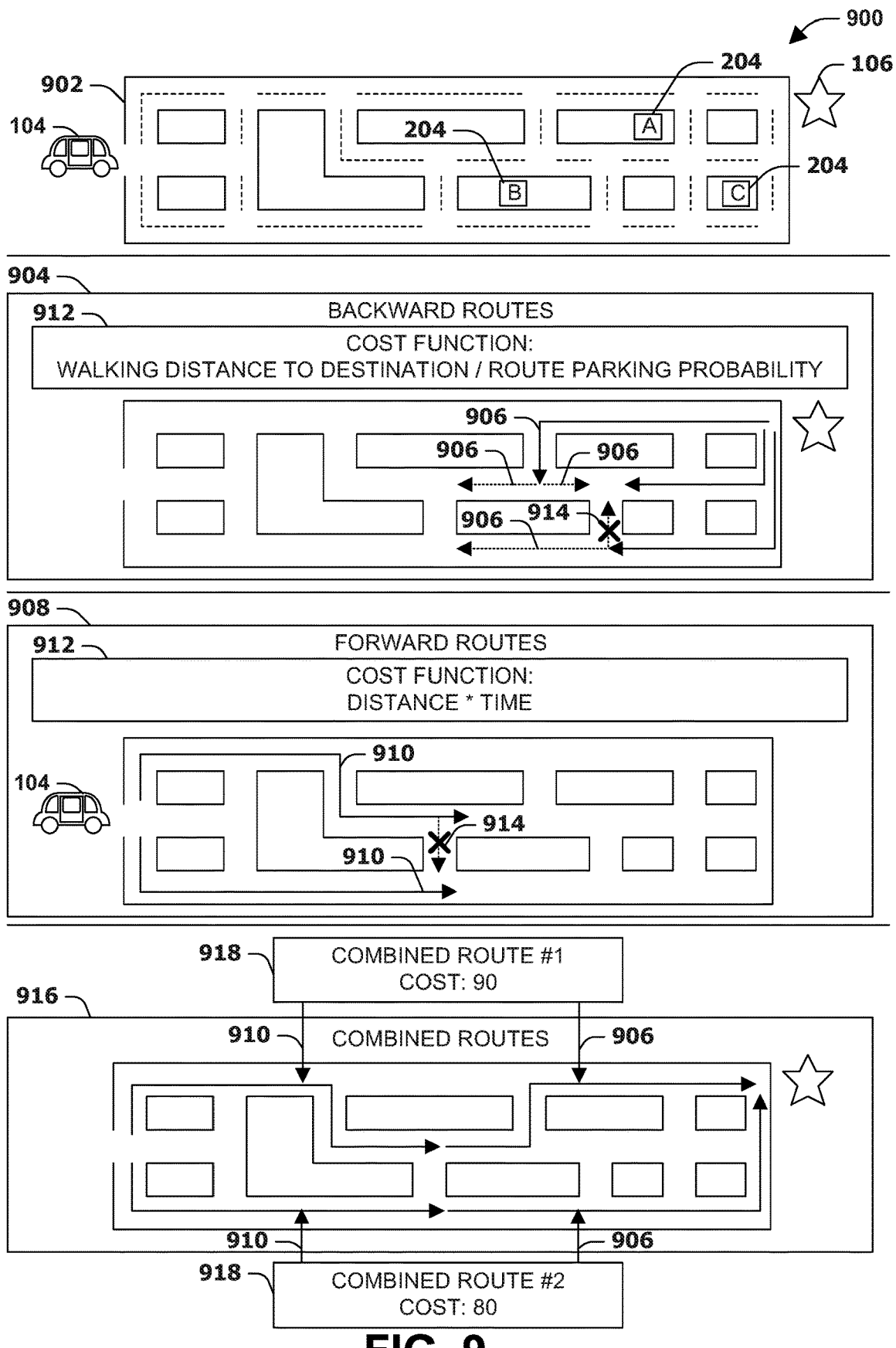
FIG. 9 is an illustration of an example scenario featuring a bidirectional evaluation of routes to produce a set of combined routes in accordance with the techniques presented herein.

FIG. 9 is an illustration of an example scenario 900 featuring one such technique for generating and comparing routes 210 involves a state search. In this example scenario 900, an embodiment generates and compares parking routes 210 for a particular map 902 as sequences of segments 202 in a bidirectional manner. The parking routes 210 are generated by performing a backward evaluation 904 of backward routes 906 that begin at the destination 106 and iteratively append segments branching outward from the destination 106 and encountering various parking opportunities 204, and a forward evaluation 908 of forward routes 910 that begin at the origin (such as a current location of a vehicle 104). The generation of routes 210 may occur in an iterative manner; e.g., after generating a first backward route 906 that ends at a particular location (such as the top backward route 906 in the backward evaluation 904), the backward evaluation 904 may generate new backward routes 906 by appending various segments 202 to the end of the first backward route 906. The backward evaluation 904 may compare the backward routes 906 using a backward cost function 912, e.g., a walking distance from the midpoint of the backward route 906 to the destination 206 divided by the route parking probability for the backward route 906, where more advantageous backward routes 906 present a lower cost as calculated by the backward cost function 912. Backward routes 906 with costs that compare unfavorably with the other backward routes 906 under consideration may be eliminated 914 from further evaluation (e.g., a first backward route 906 between the destination 206 and an end location may present a higher cost than a second backward route 906 between the destination 206 and the same end location).

As further shown in the example scenario 900 of FIG. 9, the forward evaluation 908 of forward routes 910 from a starting location 108 (such as the current location of the vehicle 104) toward the destination 106 may similarly occur in an iterative manner, e.g., by evaluating some forward routes 910 and then appending segments 202 that connect with the end of each forward route 910. The forward routes 910 are similarly evaluated using a forward cost function 912, and optionally a different cost function than the backward cost function 912 used during the backward evaluation 904 of the backward routes 906. In this example scenario 900, the forward cost function 912 for the forward routes 908 is a product of the distance of the route 210 and the estimated time to traverse the route, wherein more advantageous forward routes 910 present a lower cost as calculated by the forward cost function 912. Forward routes 910 with costs that compare unfavorably with the other forward routes 910 under consideration may be eliminated 914 from further evaluation (e.g., a first forward route 910 between the start location 108 and an end location may present a higher cost than a second forward route 108 between the starting location 108 and the same end location, but with fewer turns, a shorter distance, or a lower time estimate).

As further shown in the example scenario 900 of FIG. 9, a combined evaluation 916 may be performed to combine the backward routes 906 and the forward routes 910 into combined routes 918. For example, a backward route 906 between a particular location and the destination 106 may be concatenated to a forward route 910 between a starting location 108 and the same particular location to formulate a complete combined route 916 between the starting location 108 and the destination 106. The combined routes 918 generated in this manner may be compared, e.g., by multiplying the cost generated by the backward cost function 912 for the backward route 906 portion and the cost generated by the forward cost function 912 for the forward route 910 portion. This aggregation may enable the generation of one or more combined routes 918, which may either be presented to the user 104 (optionally sorted by aggregated cost function), or may be compared to select a single combined route 918 to be presented as a recommendation 216 to the user 104 or the supplemented route for an autonomous vehicle. In some variations, the combined routes 918 may retain distinct portions with different characteristics; e.g., the user 102 may be ordinarily advised, or the vehicle 104 may be autonomously navigated, in a conventional manner while following the forward route 906 portion of the combined route 918, but the user 102 may be advised to begin looking for parking, or the autonomous vehicle 104 may begin actively scanning for parking, while traveling the backward route 906 portion of the combined route 910.

The evaluation presented in the example scenario 900 of FIG. 9 may include a number of further variations. As a first such example, the backward evaluation 904 may include a determination of a cost baseline, e.g., the cost to the user 102 of performing an undirected search for parking near the destination 106, and against which the other routes 210 are compared. The cost baseline may also be utilized to evaluate the cost to the user 102 of performing such an undirected search after completing a route 210 and failing to find a vacancy 118 for any of the parking opportunities 206. As a second such example, the backward evaluation 904 and the forward evaluation 908 may be performed consecutively and/or concurrently. In some embodiments, a cooperative evaluation may be performed; e.g., if the backward evaluation 904 produces favorable backward routes 906 that end at a particular location, the forward evaluation 908 may select for forward routes 910 toward that location, and/or may exclude forward routes 910 that are directed toward locations that do not correspond to the end locations of the backward routes 906. Many variations may be utilized to generate combined routes 918 in accordance with the techniques presented herein.

Figure 10:
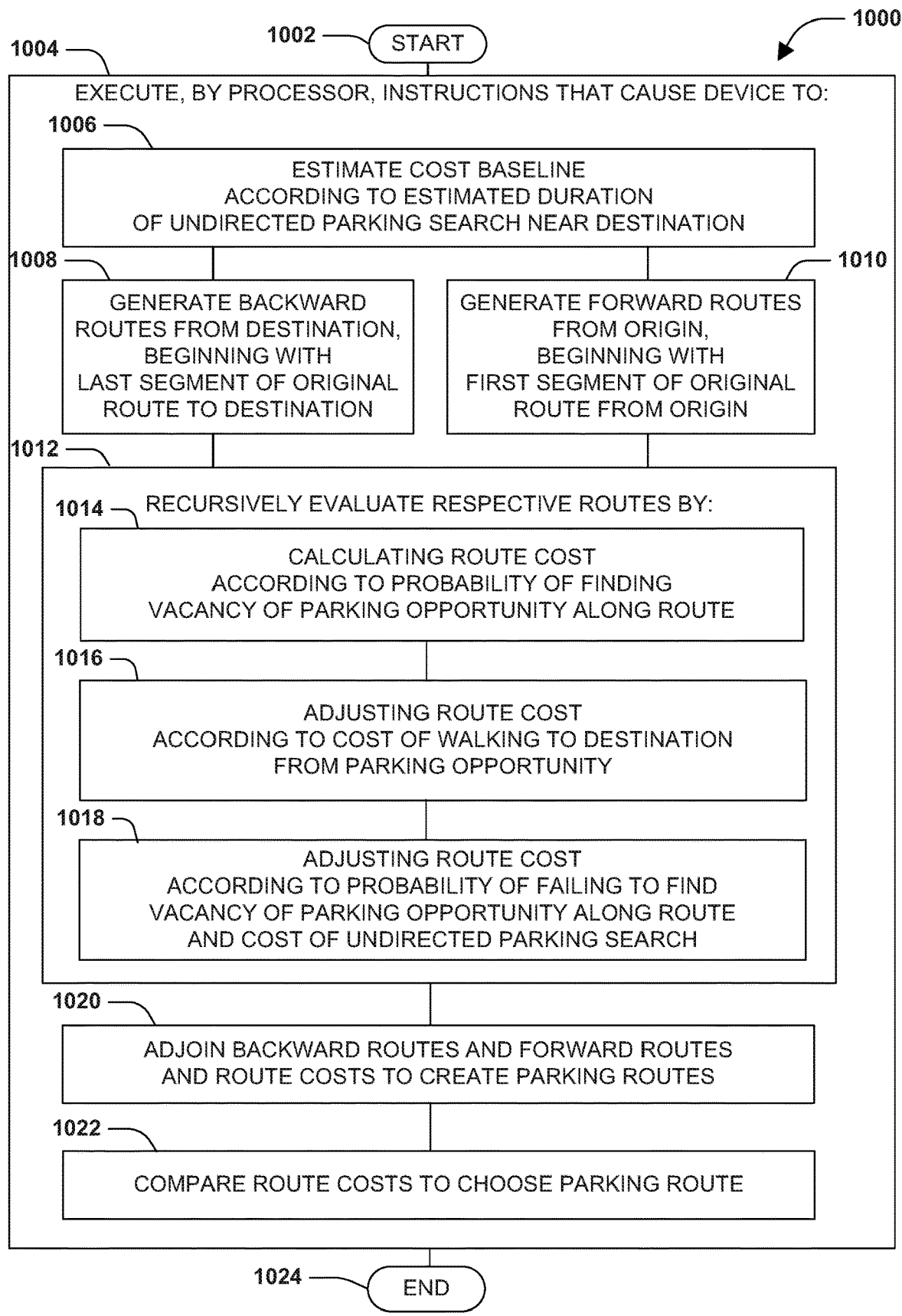
FIG. 10 is an illustration of an example method of generating and comparing routes to identify a parking route in accordance with the techniques presented herein.

FIG. 10 is an illustration of an example method 1000 that presents one variation in the generation of parking routes 210 in accordance with some variations of the techniques presented herein. The example method 1000 may involve a navigation device having a processor 304, and may be implemented, e.g., as a set of instructions stored in a memory component of a device (e.g., a memory circuit, a platter of a hard disk drive, a solid-state memory component, or a magnetic or optical disc) that, when executed by the processor of the device, cause the navigation device to perform the techniques presented herein.

The example method 1000 begins at 1002 and involves executing 1004 the instructions on the processor 304 of the example navigation device. Specifically, execution of the instructions causes the example navigation device to estimate 1006 a cost baseline, according to an estimated duration of an undirected parking search near the destination 106 (e.g., a random or semi-random traversal that a user 102 might perform near the destination 102 to find parking).

Execution of the instructions also causes the example navigation device to generate 1008 backwards routes from the destination 106, beginning with the last segment 202 of an original route to the destination 106. Concurrently and/or consecutively, execution of the instructions also causes the device to generate 1010 forwards routes from an origin, beginning with the first segment 202 of the original route from the origin to the destination 106. Execution of the instructions also causes the example navigation device to recursively evaluate 1012 the respective routes by calculating 1014 a route cost according to a probability of finding a vacancy 118 of a parking opportunity 204 along the route 210; adjusting 1016 the route cost according to the cost of walking to the destination 106 from a parking opportunity 204 along the route 210; and adjusting 1018 the route cost according to the probability of failing to find a vacancy 118 of any parking opportunity 204 along the route 210 and the cost of the unidirected parking search that the user 102 is likely to perform after the failure of the parking route 210 to find a vacancy 118. Execution of the instructions also causes the example navigation device to form routes 210 by adjoining 1020 a backward route 210 and a forward route 210, as well as the route costs of the backward route 201 and the forward route 210 (e.g., the inverse of the product of the inverses of the parking route probability 212 of the backward route and the parking route probability 212 of the forward route, adjusted by the costs associated therewith). The routes 210 may be limited, e.g., by distance from the duration 106, and/or by a boundary that defines a maximum walking distance that a user 102 may be willing to undertake between a parking opportunity 106 along the route 210 and the destination 106. Execution of the instructions also causes the example navigation device to compare 1022 the route costs in order to choose a parking route 210, which may be used, e.g., in any of the ways set forth herein. In this manner, the formulation, comparison, and selection of parking routes 210 may be achieved in a computationally efficient manner. Many such techniques may be utilized to formulate and compare the parking routes 210 in variations of the techniques presented herein.

E5. Application of Parking Routes

A fifth aspect that may vary in embodiments of the techniques presented herein involves the uses of the selected parking routes 210 generated thereby. Some of these illustrations are provided in the example set 1100 of FIG. 11.

Figure 11:
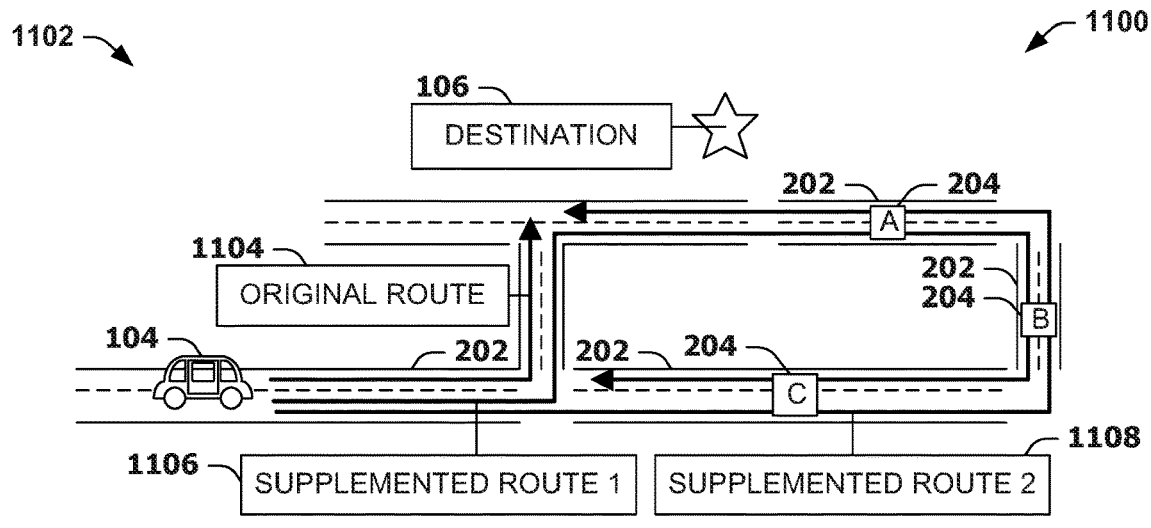
FIG. 11 is an illustration of a variety of techniques for utilizing a selected parking route in facilitating the navigation of a vehicle in accordance with the techniques presented herein.
Figure 11:
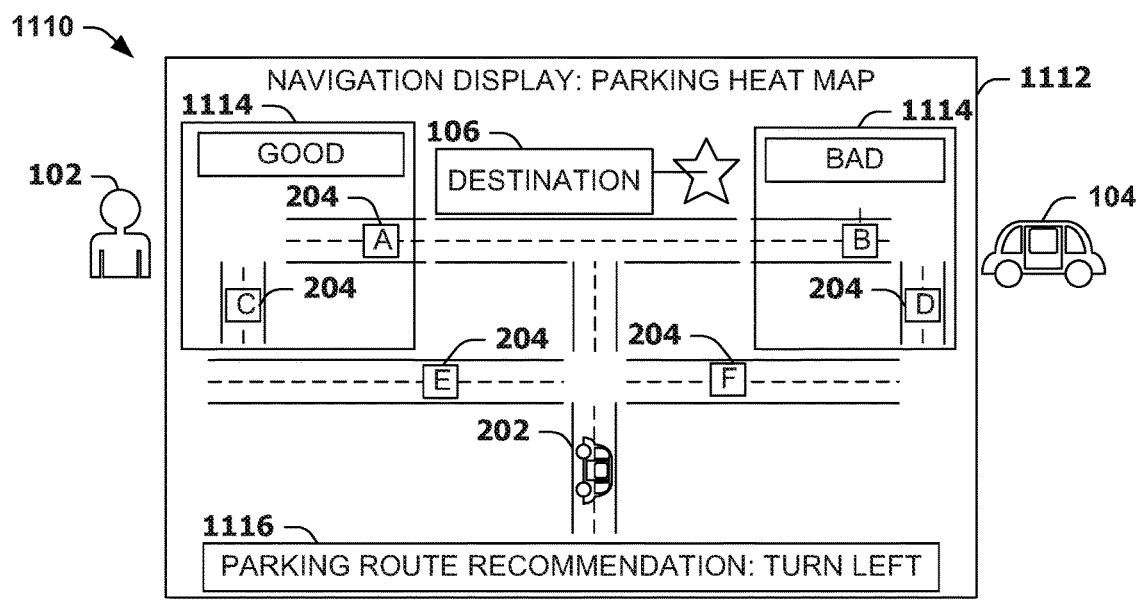
Figure 11:
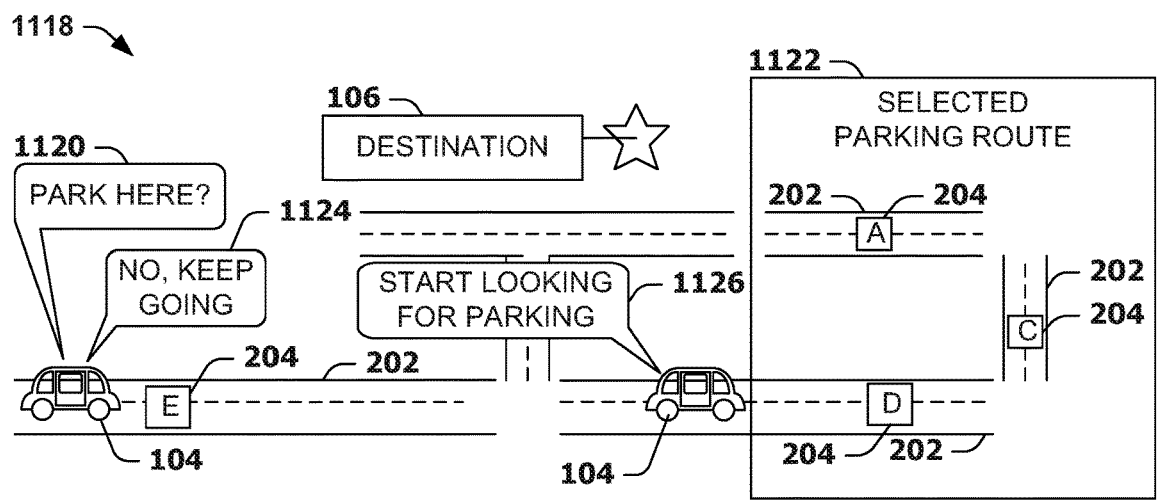

As a first variation of this fifth aspect, and as shown in a first example scenario 1102 of FIG. 11, a parking route 210 may be presented to a user 102 of a vehicle 104 on a map. Whereas an original route 1104 may lead the user 102 directly to the destination 106, a supplemented route may be displayed on the map that depicts the selected route 210 to find parking, optionally in a different visual style such as color. In some variations, more than one supplemented route may be selected and displayed, such as a first supplemented route 1106 and a second supplemented route 1108, which may balance the probabilistic parking route recommendations with a degree of user choice.

As a second variation of this fifth aspect, a selected parking route 210 may be presented to the user 102 as a recommendation, e.g., as a general notification such as "parking is more probable to the left" or as a set of turn-by-turn directions. As a first such example, the device 104 may already have a current route 110 to the destination 106, and may add the parking route 210 to the current route 110 to generate a supplemented route that is presented to the user 102. The addition may comprise, e.g., appending the parking route 210 to the current route 110; merging the parking route 210 with the current route 110; and/or substituting the parking route 210 for the current route 110. In some variations, the device may indicate, in a visual presentation of the supplemented route such as a map, the portion of the combined route that comprises the parking route 210 (e.g., the portion of the route along which the user 102 should be looking for vacancies 118 of parking opportunities 204), and/or a visual or audible cue as to when the user 102 should start looking for vacancies 118. As a second such example, the recommendations may advise the user of different advantages of different routes. For example, for a first parking route 210, the device may identify a first advantage of the first parking route 210 over a second parking route 210, and a second advantage of the second parking route 210 over the first parking route 210. The device may present both the first parking route and the second parking route to the user 102, and may include a first description of the first advantage of the first parking route 210 and a second description of the second advantage of the second parking route 210 (e.g.: "Parking is more plentiful but more expensive on First Street, and is free but less probable on Third Street"). The device may receive, from the user 102, a selection of at least one of the first parking route 210 and the second parking route 210 (optionally including a request to try both), and may update the route.

As a third variation of this fifth aspect, a parking route 210 may be presented to the user in a different visual manner. The second example scenario 1110 of FIG. 10 depicts a heat map 1112 of a region including the destination 106 that depicts the respective parking routes 210 with a visual indication of the parking route probabilities 212, such as a first region 1114 that is associated with a first parking route 210 and that presents a high parking route probability 214 and a second region 1114 that is associated with a second parking route 210 and that presents a low parking route probability 214. Other visual representations are also possible, such as a green line indicating a first parking route 210 with a high parking route probability 214 and a yellow line indicating a second parking route 210 with a lower parking route probability 214. Alternatively or additionally, a turn-by-turn recommendation 1116 may also presented in a visual and/or audial manner to guide the user 102 through the parking route 210.

As a fourth variation of this fifth aspect, a selected parking route 210 may be chosen to advise the user 102 on an ad-hoc basis, such as advising the user 102 of whether or not to take a discovered vacancy 118 at a parking opportunity 204. As shown in the third example scenario 1118 of FIG. 11, a device may receive from a driver an inquiry 1120 about a current parking option, such as a request for a recommendation of whether or not to park the vehicle 104 in a parking garage that has a reported vacancy 118 but that is costly and far away from the destination 106. The device may evaluate a forward parking route probability of finding parking along the parking route 1122 from the current location of the vehicle 104, choose a recommendation about the current parking option based on the forward parking route probability, and present the recommendation 1124 to the driver. Alternatively or additionally, when the vehicle 104 reaches a portion of a supplemented route comprising the parking route 210, an embodiment may present a prompt 1026 to advise the user to begin looking for parking.

As a fifth variation of this fifth aspect, a parking route 210 may be used to control the operation of an autonomous vehicle 104, such as a self-driving vehicle that is tasked with parking near a destination 106. The techniques presented herein may be added to the control system of the autonomous vehicle to promote the efficient and expeditious location of a vacancy 118 for parking the autonomous vehicle 104. As one example, an autonomously controlled vehicle 104 may utilize the probabilities 206 along a selected parking route 201 to adjust the speed of the vehicle 104; e.g., the vehicle 104 may slow down near parking opportunities 204 with a relatively good probability 206 in order to preserve the option of taking an identified vacancy 118, and may maintain a typical speed while passing parking opportunities 204 with a relatively low probability 206, thus reducing slow traffic. Many such uses may be devised of the probabilistic parking routes 210 generated in accordance with the techniques presented herein.

F. Supporting Information

The significance of the subject matter and techniques presented herein may be supported by the study entitled *INRIX: The Impact of Parking Pain in the US, UK and Germany*, which is currently available at the following address: http://www2.inrix.com/research-parking-2017. The entirety of the referenced study is hereby incorporated by reference as if fully rewritten herein.

Table 4 of this study reveals the amount of time that users in various cities spend, per trip, searching for parking both on-street and off-street. This study reveals that users 102 in all cities that were studied exhibit significant delays in finding parking. These figures reflect that the average user, across all cities studied, spends 61 hours per year searching for parking. Multiplied by the number of users 102 who routinely drive in the studied cities, these delays reveal enormous amounts of time spent on the task of searching for parking—and a correspondingly enormous magnitude of unproductively spent user time, unproductively spent fuel, and user frustration. Moreover, while users 102 are engaged in the task of parking, the vehicles 104 driven by such users compound the traffic problem for all other users 102 who are also searching for parking or who are merely driving through the region.

This study provides further information that supports other aspects of the present disclosure. Table 10 presents the magnitude of frustration experienced and expressed by users 102 concerning the task of finding parking while traveling to various destinations 106 in various cities, even to the extent of affecting the users' willingness to travel to such destinations 106. Table 13 of this study presents the finding that 16% of drivers in the U.S., UK, and Germany identified finding parking as the greatest source of frustration in the experience of driving, even exceeding other sources such as traffic, cost, maintenance, and accidents. Table 14 further reveals that users 102 experience a variety of information sources, including frustration over parking availability; wasted search time; and stress caused by the parking experience. Table 19 further reveals that information indicating a high probability of parking is likely to impact users' decisions to drive for more than 65% of drivers in each of the U.S., UK, and Germany. Table 22 demonstrates that users of different types and in different regions exhibit variations in preferences, which may be taken into account through user-specific weighting and/or threshold of parking probabilities 206.

FIG. 12 presents a result set of a set of field tests conducted with an embodiment of the techniques presented herein. In these field tests, conducted in February 2018, drivers were asked to park in a busy section of a major metropolitan region where parking is usually quite difficult to find while being assisted by a navigation device that was configured in accordance with the present disclosure. Results were gathered by monitoring user behavior to determine whether or not users 102 following a parking route 210 generated by the navigation device succeeded in finding parking. With the exception of a few instances in which user data was inconclusive, the test results revealed that in 15 out of 21 tests—71% of trials—users were successful in finding a vacancy 118 at a parking opportunity 204 along the parking route 210. Compared with expectations of parking difficulty in this area at this time of day, these results demonstrate significant facilitation with the task of parking.

G. Computing Environment

Figure 13:
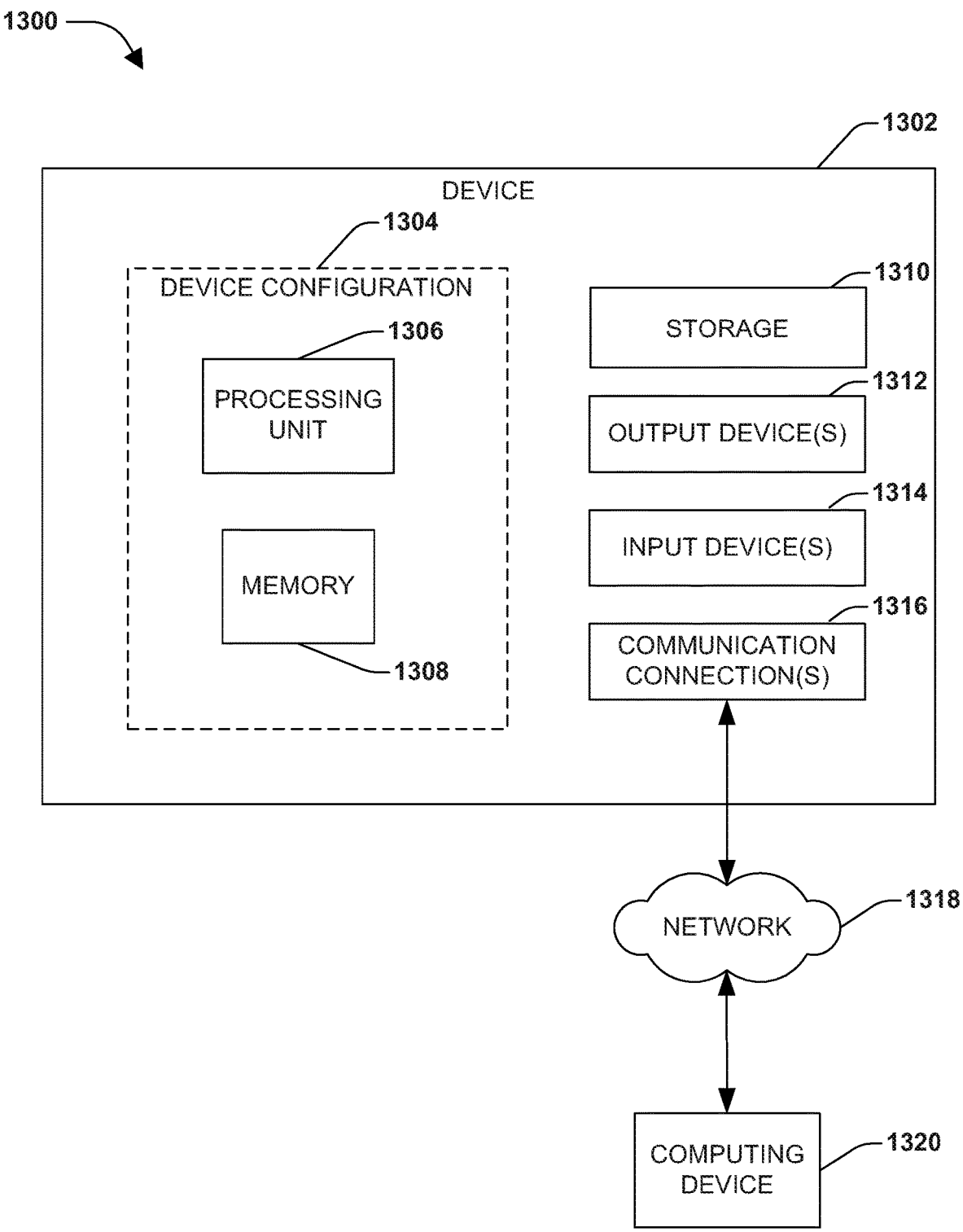
FIG. 13 is a component block diagram of an exemplary computing environment wherein one or more of the aspects of the techniques presented herein may be implemented.

FIG. 13 and the following discussion provide a brief, general description of a suitable computing environment to implement embodiments of one or more of the provisions set forth herein. The operating environment of FIG. 13 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 13 illustrates an example of a system 1300 comprising a computing device 1302 configured to implement one or more embodiments provided herein. In one configuration, computing device 1302 includes at least one processing unit 1306 and memory 13088. Depending on the exact configuration and type of computing device, memory 1308 may be volatile (such as RAM, for example), non-volatile (such as ROM, flash memory, etc., for example) or some combination of the two. This configuration is illustrated in FIG. 13 by dashed line 1304.

In other embodiments, device 1302 may include additional features and/or functionality. For example, device 1302 may also include additional storage (e.g., removable and/or non-removable) including, but not limited to, magnetic storage, optical storage, and the like. Such additional storage is illustrated in FIG. 13 by storage 1310. In one embodiment, computer readable instructions to implement one or more embodiments provided herein may be in storage 1310. Storage 1310 may also store other computer readable instructions to implement an operating system, an application program, and the like. Computer readable instructions may be loaded in memory 1308 for execution by processing unit 1306, for example.

The term "computer readable media" as used herein includes computer storage media. Computer storage media includes volatile and nonvolatile, removable and non-removable media implemented in any method or technology for storage of information such as computer readable instructions or other data. Memory 1308 and storage 1310 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 1302. Any such computer storage media may be part of device 1302.

Device 1302 may also include communication connection(s) 1316 that allows device 1302 to communicate with other devices. Communication connection(s) 1316 may include, but is not limited to, a modem, a Network Interface Card (NIC), an integrated network interface, a radio frequency transmitter/receiver, an infrared port, a USB connection, or other interfaces for connecting computing device 1302 to other computing devices. Communication connection(s) 1316 may include a wired connection or a wireless connection. Communication connection(s) 1316 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 1302 may include input device(s) 1314 such as keyboard, mouse, pen, voice input device, touch input device, infrared cameras, video input devices, and/or any other input device. Output device(s) 1312 such as one or more displays, speakers, printers, and/or any other output device may also be included in device 1302. Input device(s) 1314 and output device(s) 1312 may be connected to device 1302 via a wired connection, wireless connection, or any combination thereof. In one embodiment, an input device or an output device from another computing device may be used as input device(s) 1314 or output device(s) 1312 for computing device 1302.

Components of computing device 1302 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 1302 may be interconnected by a network. For example, memory 1308 may be comprised of multiple physical memory units located in different physical locations interconnected by a network.

Those skilled in the art will realize that storage devices utilized to store computer readable instructions may be distributed across a network. For example, a computing device 1320 accessible via network 1318 may store computer readable instructions to implement one or more embodiments provided herein. Computing device 1302 may access computing device 1320 and download a part or all of the computer readable instructions for execution. Alternatively, computing device 1302 may download pieces of the computer readable instructions, as needed, or some instructions may be executed at computing device 1302 and some at computing device 1320.

H. Usage of Terms

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A device that provides navigation of a vehicle to park near a destination, the device comprising:
   a processor; and
   a memory storing instructions that, when executed by the processor, cause the device to:
      identify a set of routes near the destination, respective routes comprising a set of segments, wherein a first route of the set of routes comprises a first set of two or more segments and a second route of the set of routes comprises a second set of two or more segments;
      for respective routes near the destination:
         compute a probability of vacancies at each of a plurality of parking opportunities along the segments of the route to generate a parking probability for each of the plurality of parking opportunities,
         weight the parking probability at each of the plurality of parking opportunities according to a target arrival time at the destination, an estimated arrival time at the parking opportunity, and a secondary travel duration between the parking opportunity and the destination to generate a weighted parking probability for each of the plurality of parking opportunities; and
         aggregate the weighted parking probabilities of the parking opportunities to identify a parking route probability for the route;
      compare the parking route probabilities of the respective routes to select a parking route; and
      navigate the vehicle based on the parking route.

2. The device of claim 1, wherein identifying the set of routes further comprises: limiting the set of routes to a walking distance threshold for a walking distance between parking opportunities of the segments of the route and the destination.

3. The device of claim 1, wherein:
   the device further comprises a parking probability data source; and
   execution of the instructions further causes the device to:
      receive a parking report from a second vehicle for a selected segment; and
      store, in the parking probability data source, a segment parking probability for the selected segment according to the parking report.

4. The device of claim 3, wherein:
   receiving the parking report further comprises: receiving, from the second vehicle, a parking opportunity notification for the selected segment; and
   identifying the parking route probability further comprises: identifying the parking route probability of routes comprising the selected segment according to the parking opportunity notification.

5. The device of claim 1, wherein:
   executing the instructions further causes the device to, for respective segments, identify a preference score for parking the vehicle in the respective parking opportunities; and
   selecting the parking route further comprises: weighting the parking route probabilities by the preference scores of the parking opportunities of the respective segments to identify the parking route.

6. The device of claim 5, wherein the preference score is proportional to a proximity of the respective parking opportunities to the destination.

7. The device of claim 6, wherein:
   executing the instructions further causes the device to identify, from a local weather report, a weather condition; and
   the weighting further comprises: adjusting the weighting of the parking route probabilities by the preference scores proportional to the proximity according to the weather condition.

8. The device of claim 6, wherein the weighting the parking probability comprises: identifying, from a schedule of a user of the vehicle, the target arrival time at the destination.

9. A method of navigating a vehicle from a starting location to a destination to park near the destination, the method involving a device having a processor and comprising:
   executing, by the processor, instructions that cause the device to:
      identify a set of routes near the destination, respective routes comprising a set of segments, wherein identifying the set of routes comprises:
         initiating a first route as a first segment having a highest parking probability of a first set of segments near the destination; and
         appending, to the first segment in the first route, a next segment that is connected with the first segment and has a highest parking probability of a second set of segments connected to the first segment, wherein the next segment is between the starting location and the first segment and further from the destination than the first segment;
      for the respective routes, aggregate parking probabilities of parking opportunities along the segments of the route to identify a parking route probability for the route;
      compare the parking route probabilities of the respective routes to select a parking route; and
      navigate the vehicle based on the parking route.

10. The method of claim 9, wherein identifying the set of routes further comprises:
identifying a selected set of route start locations that are near the destination; and
formulating routes that begin at a selected route start location and extend away from the destination.

11. The method of claim 9, wherein identifying the set of routes further comprises: limiting the set to routes that comprise parking opportunities comprising a walking distance to the destination that is within a walking distance threshold.

12. The method of claim 9, wherein identifying the set of routes further comprises: limiting the set to routes that present a parking route probability that is above a parking route probability threshold.

13. The method of claim 9, wherein:
a dynamic segment exhibits a dynamic parking availability; and
identifying the set of routes further comprises:
identifying a route that includes the dynamic segment; and
inserting at least two instances of the dynamic segment in the route.

14. The method of claim 9, wherein:
a second vehicle is also parking near the destination; and
selecting the parking route further comprises: distributing the parking probabilities of the parking opportunities between the vehicle and the second vehicle.

15. A method for navigating a vehicle to park near a destination, comprising:
identifying a set of routes near the destination, respective routes comprising a set of segments, wherein a first route of the set of routes comprises a first set of two or more segments and a second route of the set of routes comprises a second set of two or more segments;
for respective routes near the destination:
computing a probability of vacancies at each of a plurality of parking opportunities along the segments of the route to generate a parking probability for each of the plurality of parking opportunities,
weighting the parking probability at each of the plurality of parking opportunities according to a target arrival time at the destination, an estimated arrival time at the parking opportunity, and a secondary travel duration between the parking opportunity and the destination to generate a weighted parking probability for each of the plurality of parking opportunities; and
aggregating the weighted parking probabilities of the parking opportunities identify a parking route probability for the route;
comparing the parking route probabilities of the respective routes to select a parking route; and
navigating the vehicle based on the parking route.

16. The method of claim 15, wherein the weighting comprises:
calculating a walking duration between the respective parking opportunities and the destination to generate the secondary travel duration between the respective parking opportunities and the destination.

17. The method of claim 15, comprising:
assigning a navigation complexity score to each segment; and
weighting the parking route probability of each route based upon the navigation complexity scores of the segments comprised within the route.

18. The method of claim 15, comprising:
determining weather conditions at the destination; and
weighting the parking route probabilities according to the weather conditions.

19. The method of claim 15, wherein identifying the set of routes comprises:
initiating the first route as a first segment having a highest parking probability of a first set of segments near the destination; and
appending, to the first segment in the first route, a next segment that is connected with the first segment and has a highest parking probability of a second set of segments connected to the first segment.

20. The method of claim 15, wherein:
a second vehicle is also parking near the destination; and
selecting the parking route comprises distributing the weighted parking probabilities of the parking opportunities between the vehicle and the second vehicle.

* * * * *